(12) United States Patent
Kim et al.

(10) Patent No.: US 11,005,193 B2
(45) Date of Patent: May 11, 2021

(54) ANTENNA AND ELECTRONIC DEVICE WITH THE SAME

(71) Applicant: Samsung Electronics Co., Ltd., Gyeonggi-do (KR)

(72) Inventors: Ki-Jung Kim, Gyeonggi-do (KR); Jung-Youel Bang, Gyeonggi-do (KR); Hyung-Bin Noh, Gyeonggi-do (KR); Sung-Won Park, Daegu (KR)

(73) Assignee: Samsung Electronics Co., Ltd

( * ) Notice: Subject to any disclaimer, the term of this patent is extended or adjusted under 35 U.S.C. 154(b) by 613 days.

(21) Appl. No.: 15/692,828

(22) Filed: Aug. 31, 2017

(65) Prior Publication Data

US 2018/0062275 A1    Mar. 1, 2018

(30) Foreign Application Priority Data

Aug. 31, 2016 (KR) .................. 10-2016-0111518
Feb. 28, 2017 (KR) .................. 10-2017-0026679

(51) Int. Cl.
*H01Q 21/28*    (2006.01)
*H01Q 7/00*    (2006.01)
*H01Q 1/27*    (2006.01)
*H01Q 1/22*    (2006.01)
*G06Q 20/32*    (2012.01)
*H04B 5/00*    (2006.01)

(52) U.S. Cl.
CPC ........... *H01Q 21/28* (2013.01); *G06Q 20/327* (2013.01); *H01Q 1/2208* (2013.01); *H01Q 1/273* (2013.01); *H01Q 7/00* (2013.01); *H04B 5/0031* (2013.01)

(58) Field of Classification Search
CPC .... H04B 5/0031; H04B 5/0037; H01Q 1/273; H01Q 7/06; H01Q 21/28; H01Q 1/2208
See application file for complete search history.

(56) References Cited

U.S. PATENT DOCUMENTS

| | | |
|---|---|---|
| 2009/0201771 A1 | 8/2009 | Miyahara |
| 2009/0305657 A1* | 12/2009 | Someya ................. H01Q 1/273 455/269 |
| 2012/0119965 A1* | 5/2012 | Deguchi ............. H01Q 1/2216 343/788 |
| 2013/0335284 A1 | 12/2013 | Hsu et al. |
| 2014/0009348 A1 | 1/2014 | Behin |
| 2014/0035793 A1 | 2/2014 | Kato et al. |
| 2014/0159848 A1* | 6/2014 | Konanur ................. H01F 38/14 336/180 |
| 2015/0244062 A1 | 8/2015 | Chou et al. |
| 2016/0028159 A1 | 1/2016 | Moon et al. |

(Continued)

OTHER PUBLICATIONS

European Search Report dated Jul. 9, 2019 issued in counterpart application No. 17846997.9-1205, 12 pages.

(Continued)

*Primary Examiner* — Ricardo I Magallanes
(74) *Attorney, Agent, or Firm* — The Farrell Law Firm, P.C.

(57) ABSTRACT

Disclosed is an electronic device having an enhanced emission capability and including battery, at least one first antenna provided at a front of the battery, and at least one second antenna provided at a rear of the battery, wherein the at least one first antenna and the at least one second antenna may include a magnetic body and a conducting wire that is wound around the magnetic body multiple times.

19 Claims, 27 Drawing Sheets

(56) References Cited

U.S. PATENT DOCUMENTS

| | | | |
|---|---|---|---|
| 2016/0142866 A1* | 5/2016 | Jang | H01Q 1/273 |
| | | | 455/41.1 |
| 2016/0210616 A1 | 7/2016 | Lee et al. | |
| 2016/0241306 A1 | 8/2016 | Moon et al. | |
| 2016/0254587 A1* | 9/2016 | Jung | H04B 5/0037 |
| | | | 343/702 |
| 2017/0005399 A1* | 1/2017 | Ito | H01Q 7/06 |
| 2018/0048056 A1* | 2/2018 | Jow | H01Q 1/2208 |
| 2019/0075648 A1* | 3/2019 | Nasu | H04B 1/3883 |

OTHER PUBLICATIONS

International Search Report dated Dec. 5, 2017 issued in counterpart application No. PCT/KR2017/009494, 10 pages.

\* cited by examiner

ANTENNA AND ELECTRONIC DEVICE WITH THE SAME

PRIORITY

This application claims priority under 35 U.S.C. § 119(a) to a Korean Patent Application filed in the Korean Intellectual Property Office on Aug. 31, 2016 and assigned Serial No. 10-2016-0111518, and a Korean Patent Application filed in the Korean Intellectual Property Office on Feb. 28, 2017 and assigned Serial No. 10-2017-0026679, the contents of which are incorporated herein by reference.

BACKGROUND

1. Field of the Disclosure

The present disclosure relates generally to electronic devices, and more particularly, to electronic devices having an antenna.

2. Description of the Related Art

The term "electronic device" indicates a device for performing a particular function according to programs equipped on the device. For example, electronic devices may output stored information as voices or images. Portable electronic devices, such as laptop computers, tablet personal computers (PCs), electronic schedulers, portable multimedia players, and mobile terminals, usually have a display and a battery.

Mobile communication terminals and wearable devices have become more compact and lightweight while consistently gaining new functionalities, thereby satisfying customer demands.

Recent electronic devices contain user authentication information enabling use for online/offline payments. For example, a user may use his or her electronic device containing credit card information instead of their credit card. An electronic device with such credit card functionality may perform payment in a near field communication (NFC) or magnetic secure transmission (MST) scheme.

An electronic device having an antenna for NFC purposes may deliver credit card information to a reader for payment. However, conventional antennas for these electronic devices emit radio signals in a direction perpendicular to the display, which inconveniently requires the user to angle the display towards the reader for payment.

As such, there is a need in the art for an antenna that does not require such user manipulation in order to process the payment in the electronic device.

SUMMARY

The present disclosure has been made to address at least the above-mentioned problems and/or disadvantages, and to provide at least the advantages described below.

Accordingly, an aspect of the present disclosure is to provide an electronic device that emits radio signals in various directions in addition to the direction perpendicular to the display, resulting in better reception of radio signals.

In accordance with an aspect of the present disclosure, an electronic device includes a battery, at least one first antenna provided at a front of the battery, and at least one second antenna provided at a rear of the battery, wherein the at least one first antenna and the at least one second antenna include a magnetic body and a conducting wire that is wound around the magnetic body multiple times.

In accordance with another aspect of the present disclosure, an electronic device includes a battery and at least one antenna provided at a front of the battery and including a first conducting wire that is wound multiple times in a first axial direction and a second conducting wire that is spaced apart from the first conducting wire, forms a space, and is wound multiple times in the first axial direction.

In accordance with another aspect of the present disclosure, a method for operating an electronic device includes generating a first radio signal that passes through a side surface of a housing of the electronic device by a first antenna disposed between a display and a display circuit board of the electronic device, emitting the first radio signal through a side surface, upper side, or lower side of the electronic device, winding a first conducting wire and a second conducting wire around a magnetic body, spacing the first conducting wire and the second conducting wire away from the first antenna, and generating a second radio signal in a space between the first conducting wire and the second conducting wire, and emitting the second radio signal through the space from the electronic device.

In accordance with another aspect of the present disclosure, an antenna provided in an electronic device includes a magnetic body, a first conducting wire wound around the magnetic body along a first direction, and a second conducting wire disposed on the first conducting wire and wound along a second direction different from the first direction.

BRIEF DESCRIPTION OF THE DRAWINGS

The above and other aspects, features and advantages of the present disclosure will be better understood by reference to the following detailed description when taken in conjunction with the accompanying drawings, in which.

Throughout the drawings, like reference numerals will be understood to refer to like parts, components, and structures.

DETAILED DESCRIPTION

Figure 1:
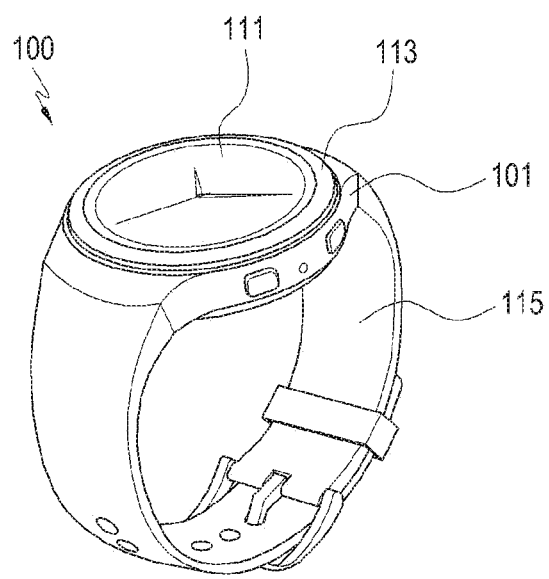
FIG. 1 is a perspective view illustrating an electronic device according to an embodiment of the present disclosure.

Hereinafter, embodiments of the present disclosure are described with reference to the accompanying drawings. It should be appreciated that the present disclosure is not limited to the embodiments, and all changes and/or equivalents or replacements thereto also apply to the scope of the present disclosure. The same or similar reference denotations may be used to refer to the same or similar elements throughout the specification and the drawings. Descriptions of well known functions and/or configurations will be omitted for the sake of clarity and conciseness.

As used herein, the expressions "have," "may have," "include," or "may include" a feature, such as a number, function, operation, or component, indicate the existence of the feature and do not exclude the existence of other features.

As used herein, the expressions "A or B," "at least one of A and/or B," or "one or more of A and/or B" may include all possible combinations of A and B. For example, "A or B," "at least one of A and B," "at least one of A or B" may indicate any of (1) including at least one A, (2) including at least one B, and (3) including at least one A and at least one B.

As used herein, the terms "first" and "second" may modify various components regardless of importance and/or order and are used to distinguish component from each other without limiting the components. For example, a first user device and a second user device may indicate different user devices from each other regardless of the order or importance of the devices, and a first component may be referred to as a second component, and vice versa, without departing from the scope of the present disclosure.

It will be understood that when an element, such as a first element, is referred to as being operatively or communicatively "coupled with/to," or "connected with/to" another element, such as a second element, the first element can be coupled or connected with/to the second element directly or via a third element. In contrast, it will be understood that when a first element is referred to as being "directly coupled with/to" or "directly connected with/to" a second element, no third element exists between the first and second elements.

The terms as used herein are provided merely to describe some embodiments thereof, but not to limit the scope of other embodiments of the present disclosure. It is to be understood that the singular forms "a," "an," and "the" include plural references unless the context clearly dictates otherwise. Technical and scientific terms used herein have the same meaning as commonly understood by one of ordinary skill in the art to which the embodiments of the present disclosure pertain. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terms defined herein are not to be interpreted to exclude embodiments of the present disclosure.

FIG. 1 is a perspective view illustrating an electronic device according to an embodiment of the present disclosure.

The electronic device may be a portable electronic device, such as a mobile communication terminal, or a wearable electronic device that may be worn on a user's body. The following will describe when the electronic device is a smart watch.

Referring to FIG. 1, the electronic device 100 may include a housing 101, a front cover 111, a bezel 113, and wearing parts 115. As used herein, the term "front direction" may indicate a direction perpendicular to a surface of the front cover 111, and the term "rear direction" may indicate an opposite direction of the "front direction."

The housing 101 may include various circuit devices, such as an application processor (AP), a communication module, a memory, and a battery, and may be formed of a metal. According to an embodiment of the present disclosure, a surrounding edge portion of the housing 101 may be formed of a metal, and another portion of the housing 101 may be formed of plastic.

The front cover 111 may be disposed on a surface of the housing 101 and formed of a transparent material such as a glass or a resin made of acrylate or polycarbonate, enabling a screen outputted from a display 102 to be viewed from the outside. For example, a screen image that appears as an analog watch may be outputted on the front cover 111.

The bezel 113 may be disposed along a surrounding edge of the front cover 111, may rotatably be coupled with the housing 101 so as to be rotated along the surrounding edge of the front cover 111, and may be formed of a metal, thus enhancing the appearance of the electronic device. According to an embodiment of the present disclosure, the bezel 113 may be utilized as an emitter for an antenna in the area where the bezel 113 is formed of a metal.

The wearing parts 115, such as a wristwatch strap, may extend from both ends of the housing so that they are away from each other, and may partially overlap each other, enabling the electronic device 100 to be worn on the user's body, such as on a wrist.

Figure 2:
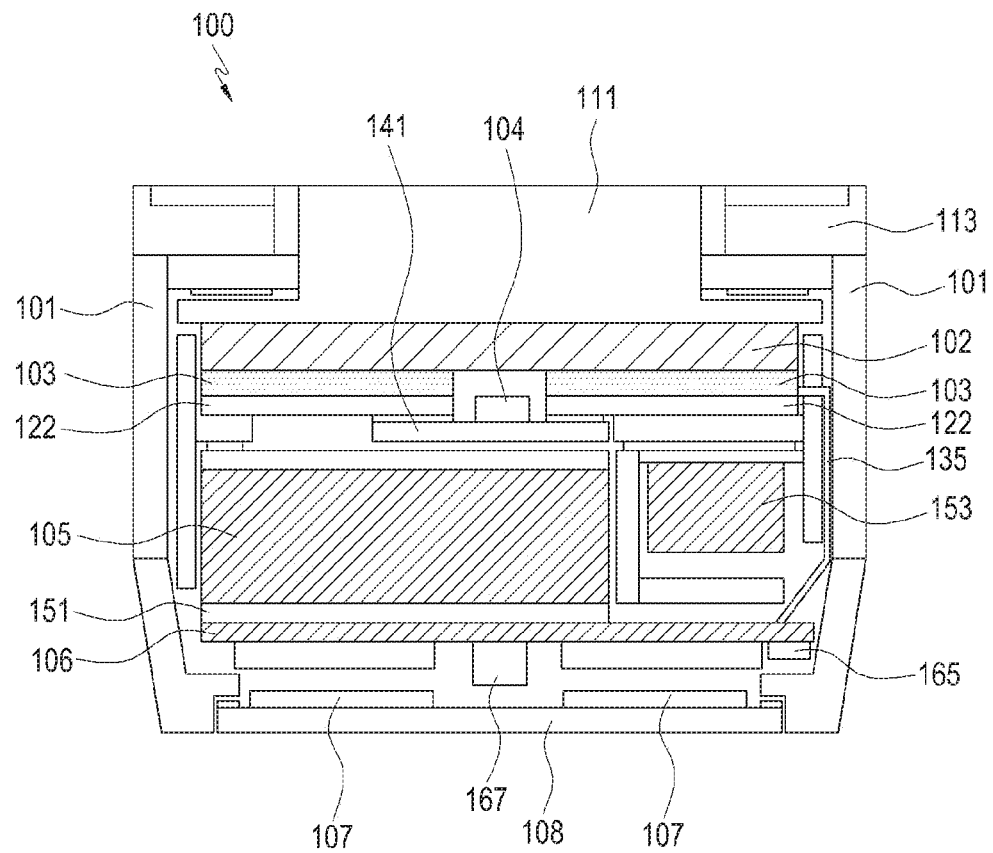
FIG. 2 is a cross-sectional view illustrating an electronic device according to an embodiment of the present disclosure.

FIG. 2 is a cross-sectional view illustrating an electronic device according to an embodiment of the present disclosure.

Referring to FIG. 2, the electronic device 100 may include a housing 101, a display 102, a first antenna 103, a display circuit board 122, an electronic part 104, a battery 105, a circuit board 106, a wireless charging antenna 107, a second antenna 165, and a rear cover 108.

The housing 101 may receive various electronic parts, such as the display 102, the first antenna 103, the second antenna 165, the display circuit board 122, the battery 105, the circuit board 106, and the wireless charging antenna 107. A portion of the housing 101, such as a side surface of the housing 101, may be at least partially formed of a material that transmits radio signals or magnetic fields.

The display 102 may be coupled to a lower surface of the front cover 111 to output images, such as pictures or videos, and may output execution screens of various applications, such as a game, Internet banking, or scheduling application, by the user's manipulation. The front cover 111 may include a liquid crystal display (LCD), a light emitting diode (LED) display, an organic light emitting diode (OLED) display, a microelectromechanical systems (MEMS) display, and an electronic paper display, may be integrated with a touchscreen panel, performing the functionality of a touchscreen, and may have an antenna emitter on an upper surface thereof, performing a wireless communication function.

The first antenna 103 may be attached to a lower surface of the front cover 111 and may send or receive radio signals in a magnetic secure transmission (MST) manner. For example, the first antenna 103 may be an MST antenna or may be an NFC antenna, as described below in greater detail.

The display circuit board 122 may be attached to a lower surface of the first antenna 103. The display circuit board 122 and the display 102 are electrically connected together, transferring electrical signals for driving the display 102.

The electronic part 104 may be disposed at a center of the housing 101 while passing through the display circuit board 122 and the first antenna 103. The electronic part 104 may be the illumination sensor or camera, and may receive electrical signals through the second circuit board 141.

The battery 105 may be disposed at the rear of the display circuit board 122. According to an embodiment of the present disclosure, the electronic device 100 may further include a speaker 153 that is positioned adjacent to a side surface of the battery 105 and includes a magnetic body.

The circuit board 106 may be disposed at the rear of the battery 105, may have mounted therein a processor and a communication module in integrated circuit (IC) chip, may be electrically connected with the battery 105, and may be electrically connected with the first antenna 103 through a connector 135 through which the first antenna 103 may receive electrical signals.

A heat radiator 151 may be provided between the circuit board 106 and the battery 105, and may receive heat from the circuit board 106 and prevent the circuit board 106 from overheating.

The wireless charging antenna 107 may be disposed under the circuit board 106, may be formed of a planar coil and of a conductive material and may be electrically connected with the circuit board 106. The wireless charging antenna 107 may generate an electric current by an electromagnetic induction from an external electronic device, which electric current may charge the battery 105 through the circuit board 106.

The rear cover 108 may form another surface 108 of the housing, may be formed of glass, and may contact the user's body portion, such as the user's wrist. According to an embodiment of the present disclosure, the rear cover 108 is not limited to being formed of glass and may also be formed of a transparent material, such as reinforced plastic.

According to an embodiment of the present disclosure, the electronic device 100 may include a heart rate monitor (HRM) 167 that is disposed on a rear surface of the circuit board 106 to sense the contraction or expansion of a blood vessel under the skin of the body by a light reflection according to a variation in the amount of blood inside the blood vessel through the rear cover 108. The processor may receive an electrical signal from the HRM 167 to calculate a heart rate.

According to an embodiment of the present disclosure, the electronic device 100 may include a second antenna 165 that is disposed on a rear surface of the circuit board 106. The second antenna 165 may be an NFC antenna that sends or receives radio signals in a NFC manner. The first antenna 103 may be an NFC antenna, and the second antenna 165 may be an MST antenna.

Various electronic parts, such as the display circuit board 122, the battery 105, the speaker 153, or the circuit board 106, may be disposed between the first antenna 103 and the second antenna 165, thereby blocking a magnetic force between the first antenna 103 and the second antenna 165. For example, the battery 105 may include a metallic film, interfering with the travel of a magnetic force through the battery 105. The speaker 153 may include a magnetic body, interfering with the travel of a magnetic force between the first antenna 103 and the second antenna 165.

Figure 3:
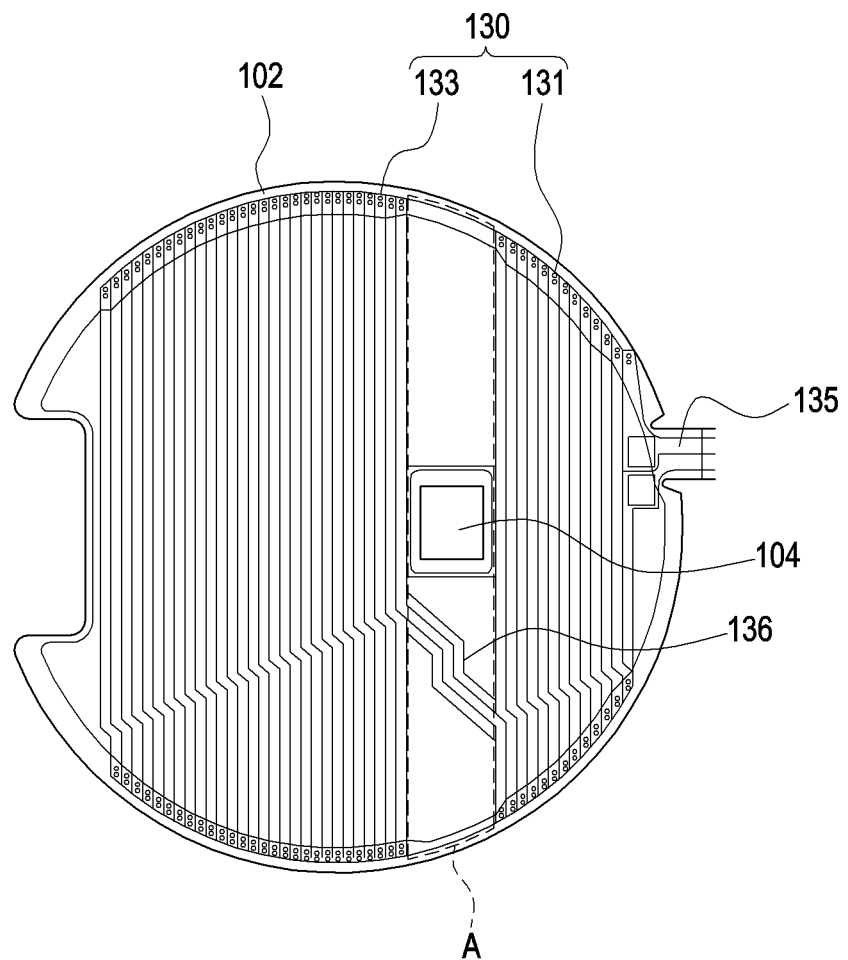
FIG. 3 is a plan view illustrating a first antenna of an electronic device according to an embodiment of the present disclosure.
Figure 4:
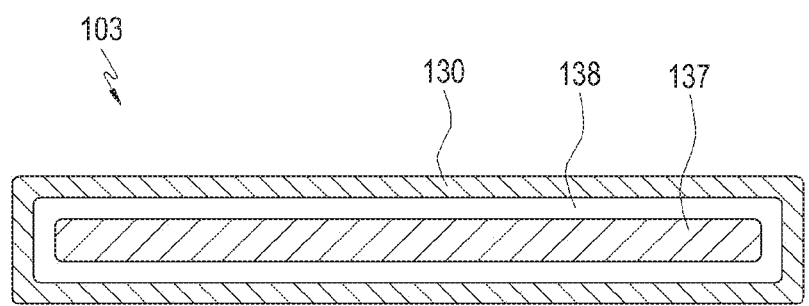
FIG. 4 is a cross-sectional view illustrating a first antenna of an electronic device according to an embodiment of the present disclosure.

FIG. 3 is a plan view illustrating a first antenna of an electronic device according to an embodiment of the present disclosure. FIG. 4 is a cross-sectional view illustrating a first antenna of an electronic device according to an embodiment of the present disclosure.

Referring to FIGS. 3 and 4, a first antenna 103 may include a magnetic body 137 and a conducting wire 130.

The magnetic body 137 may be formed of a plate that is parallel with a surface of the display 102, and may be formed of a nanocrystal such as ferrite. The conducting wire 130 may be wound around the magnetic body 137 multiple times in a first direction with respect to a first axis that is substantially parallel with a surface of the display 102. The conducting wire 130 may include a first conducting wire 131 and a second conducting wire 133 that is spaced part from the first conducting wire 131, which may be electrically connected with the second conducting wire 133 through a connecting line 136.

A space A may be formed between the first conducting wire 131 and the second conducting wire 133. The electronic part 104 may be disposed in the space A, and may be an illumination sensor or camera.

According to an embodiment of the present disclosure, an attaching member 138 may be provided between the magnetic body 137 and the first conducting wire 131, and may attach the magnetic body 137 with the conducting wire 131.

The first antenna 103 may exclude the magnetic body 137 and generate a magnetic flux inside the conducting wire 131.

The second antenna 165 may include a magnetic body and a conducting wire that is wound around the magnetic body several times, may be in the form of a chip that includes the magnetic body and the conducting wire, and may be mounted on a lower surface of the circuit board 106.

The second antenna 165 may be positioned between the battery 105 and the circuit board 106, but is not limited to the form of a chip, and thus may also be formed of a flat plate that is disposed between the battery 105 and the circuit board 106. The second antenna 165 may be spaced apart from the wireless charging antenna 107, with the circuit board 106 disposed therebetween.

Figure 5:
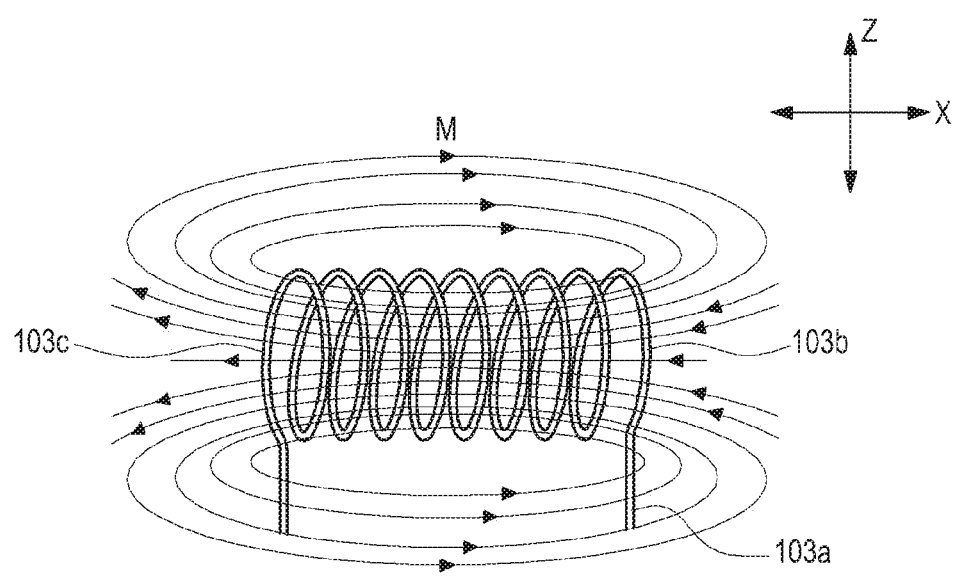
FIG. 5 is a side view illustrating a first antenna of an electronic device according to an embodiment of the present disclosure.

FIG. 5 is a side view illustrating a first antenna of an electronic device according to an embodiment of the present disclosure.

Referring to FIG. 5, a first antenna 103a may be formed in a solenoid type in which a conducting wire is wound multiple times.

A radio signal M may be generated at both ends 103c and 103b of the first antenna 103a. For example, a magnetic force corresponding to the radio signal M may be generated from a first end 103c and connected above and below the first antenna 103a to a second end 103b.

Figure 6:
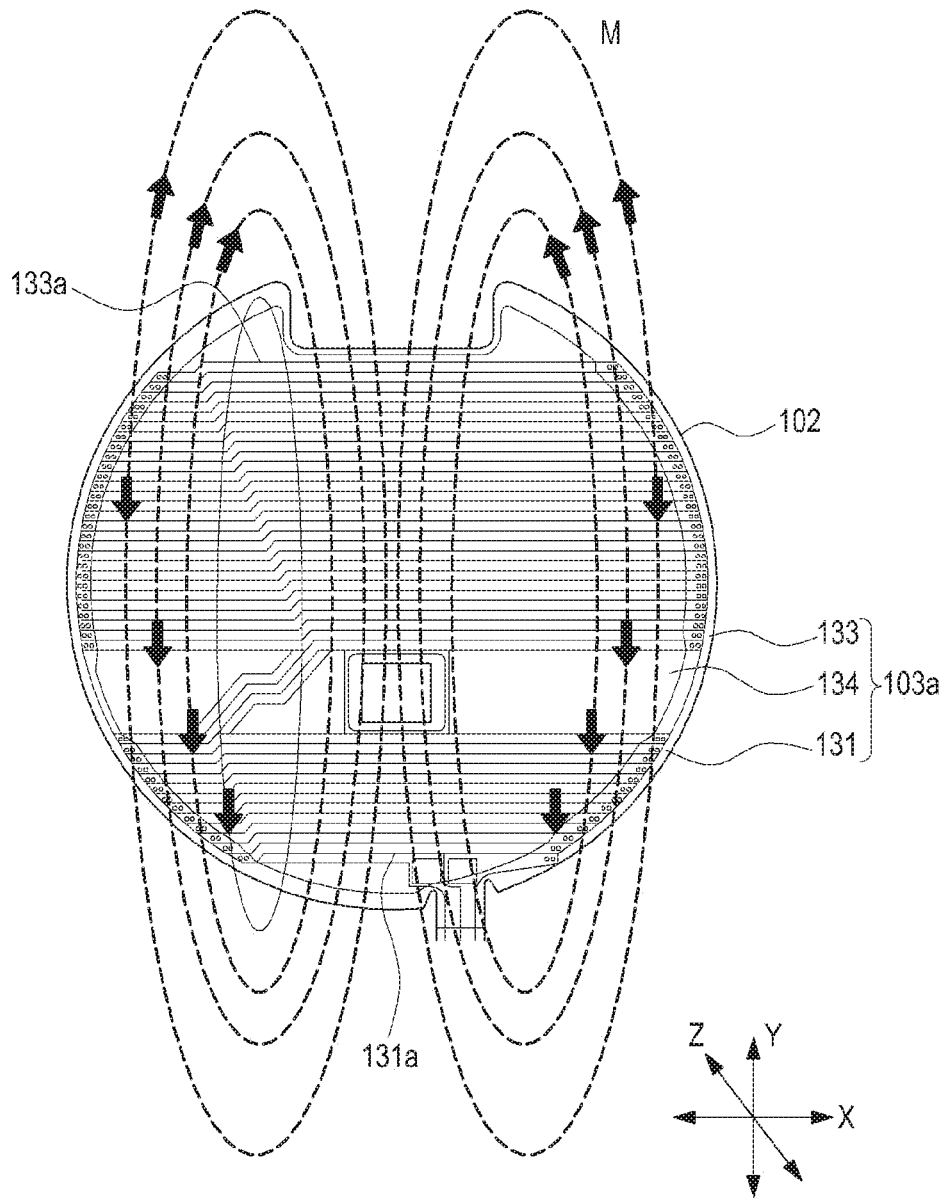
FIG. 6 illustrates radio signals from a first antenna of an electronic device according to an embodiment of the present disclosure.

FIG. 6 illustrates radio signals from a first antenna of an electronic device according to an embodiment of the present disclosure.

Referring to FIG. 6, a first antenna 103a, similar to the first antenna 103 of FIG. 5, may be formed of a solenoid in which a conducting wire is wound multiple times and may be disposed under a display 102 that has a flat surface.

A radio signal M may be generated at both ends 131a and 133a of the first antenna 103a. For example, a magnetic force corresponding to the radio signal M may be generated from a first end 133a, and the radio signal M may be emitted through a side surface of the housing 101. The radio signal M may be connected around the first antenna 103a to a second end 131a, and from the second end 131a and through the first antenna 103a to the first end 133a according to an alternating current (AC) that applies to the first antenna 103a.

Figure 7:
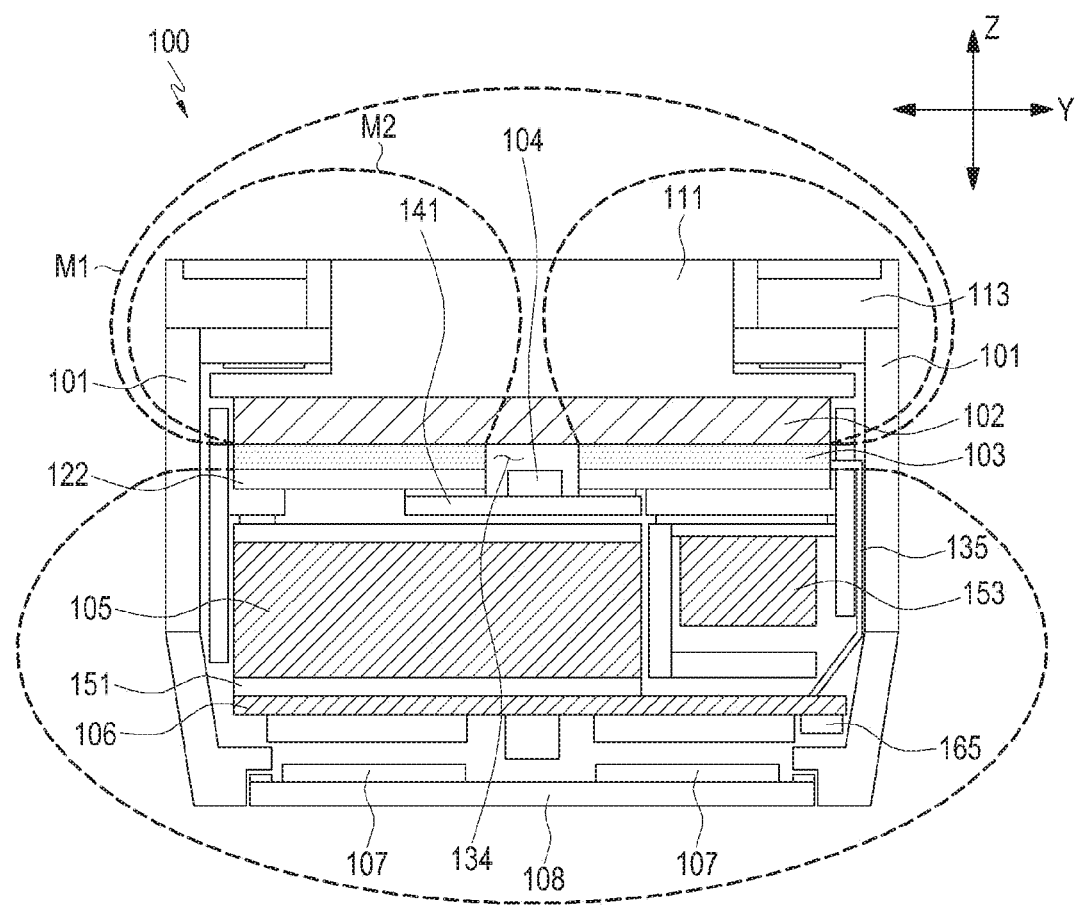
FIG. 7 is a cross-sectional view illustrating radio signals from an electronic device according to an embodiment of the present disclosure.

FIG. 7 is a cross-sectional view illustrating radio signals from an electronic device according to an embodiment of the present disclosure.

Referring to FIGS. 6 and 7, a first antenna 103 may be provided between a display 102 and a display circuit board 122. Both ends 133a and 131a of the first antenna 103 may face side surfaces of the housing 101.

Radio signals M1 and M2 may be generated at both ends of the first antenna 103. For example, at least one M1 of the radio signals may pass through a side surface of the housing 101 and may then be refracted along an outer side of the housing 101, and may travel around the display 102 or the battery 105 to be emitted to the outside of the housing 101.

Conventional antennas emit radio signals in a direction perpendicular to the display 102. Thus, the display 102 may interfere with the radio signals, resulting in a deterioration of emission capability. Moreover, the metallic bezel may interfere with the radio signals, further deteriorating emission capability.

According to an embodiment of the present disclosure, the display 102 of the electronic device 100 emits at least one M1 of the radio signals through a side surface of the housing 101, preventing interference with the radio signals by the display 102.

According to an embodiment of the present disclosure, a space 134 may be formed between the first conducting wire 131 and the second conducting wire 133. The first antenna 103 may emit the other M2 of the radio signals through the space 134 to the outside of the housing 101 through the display 102 and the front cover 111. The combination of the other M2 of the radio signals, in addition to the radio signal M1, enhances the overall emission capability.

Figure 8:
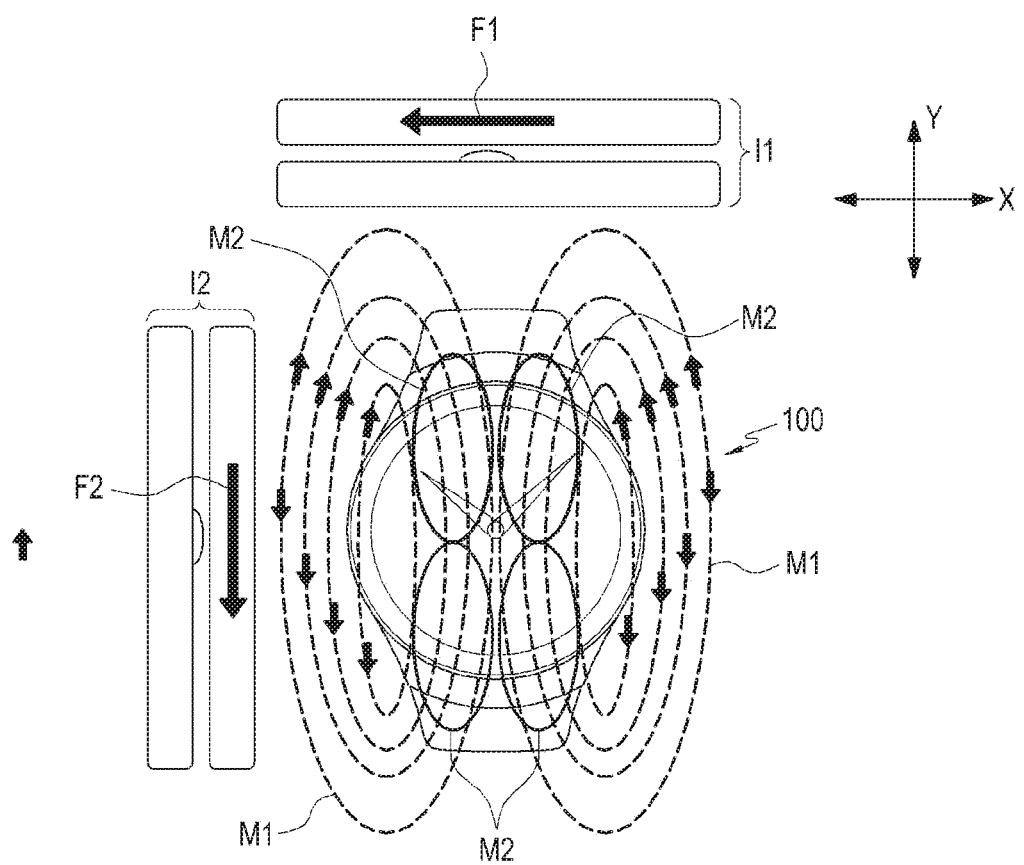
FIG. 8 is a plan view illustrating radio signals from an electronic device according to an embodiment of the present disclosure.

FIG. 8 is a plan view illustrating radio signals from an electronic device according to an embodiment of the present disclosure.

Referring to FIG. 8, a first antenna in an electronic device 100 may generate radio signals M1 and M2 at side surfaces of the electronic device 100. For example, a first reader I1 that is disposed at a first side surface of the electronic device 100 may receive the radio signals M1 and M2, generating a current F1. A second reader 12 disposed at a second surface of the electronic device 100 may receive the radio signals M1 and M2, generating a current F2. Conventional antennas emit radio signals in a direction perpendicular to the display. Thus, readers disposed at side surfaces of the electronic device may have difficulty receiving the radio signals.

According to an embodiment of the present disclosure, the first antenna in the electronic device 100 may generate radio signals at a side surface of the electronic device 100, in contrast with the conventional antennas, thereby improving the overall emission capability of the antenna.

Figure 9:
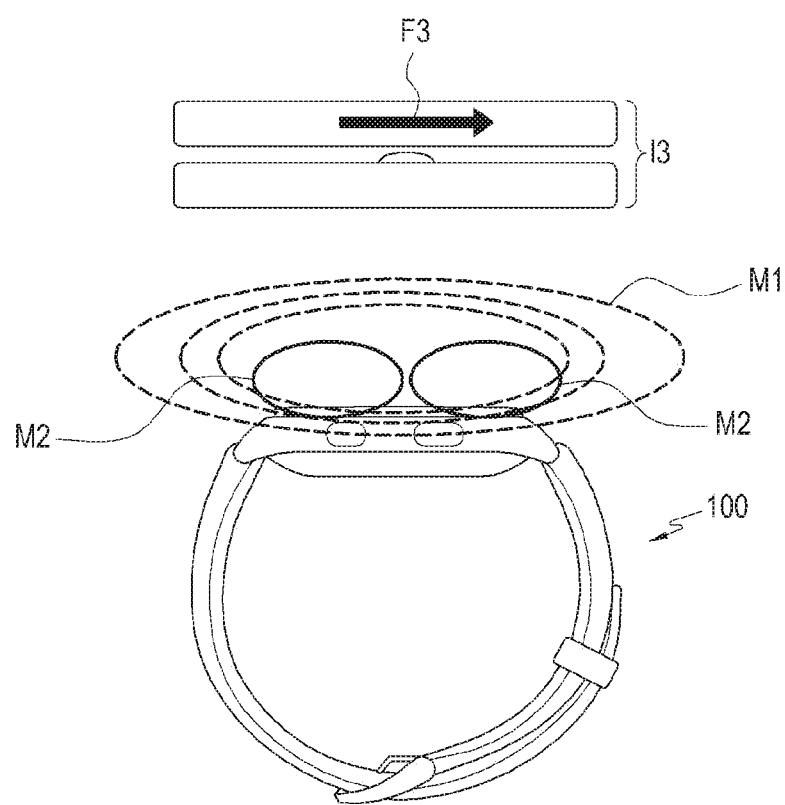
FIG. 9 is a side view illustrating radio signals from an electronic device according to an embodiment of the present disclosure.

FIG. 9 is a side view illustrating radio signals from an electronic device according to an embodiment of the present disclosure.

Referring to FIG. 9, a first antenna in an electronic device 100 may generate radio signals M1 and M2 at an upper/lower side of the electronic device 100. For example, a third reader 13 that is disposed above the electronic device 100 may receive the radio signals M1 and M2, generating a current F3. The first antenna, although generating the radio signals M1 and M2 towards a side surface of the electronic device 100, may also generate the radio signals M1 and M2 at the upper/lower side of the electronic device 100.

Figure 10:
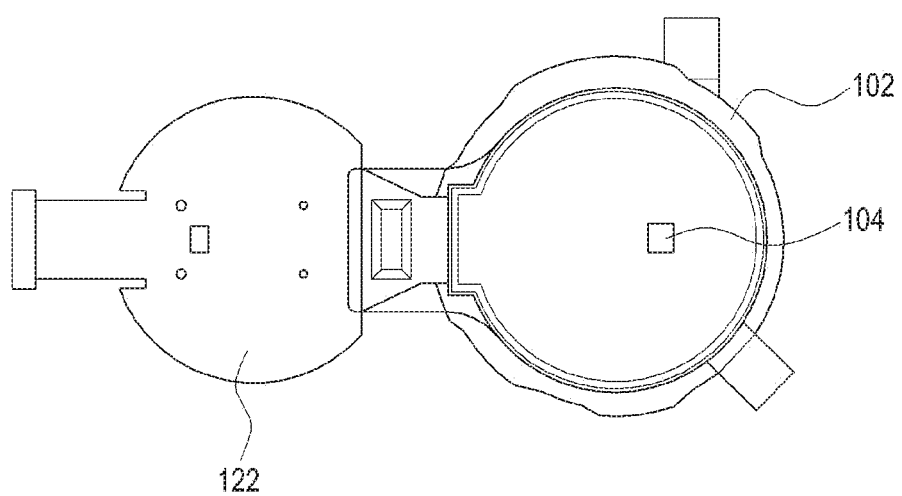
FIG. 10 is a plan view illustrating a display and a display circuit board of an electronic device according to an embodiment of the present disclosure.
Figure 11:
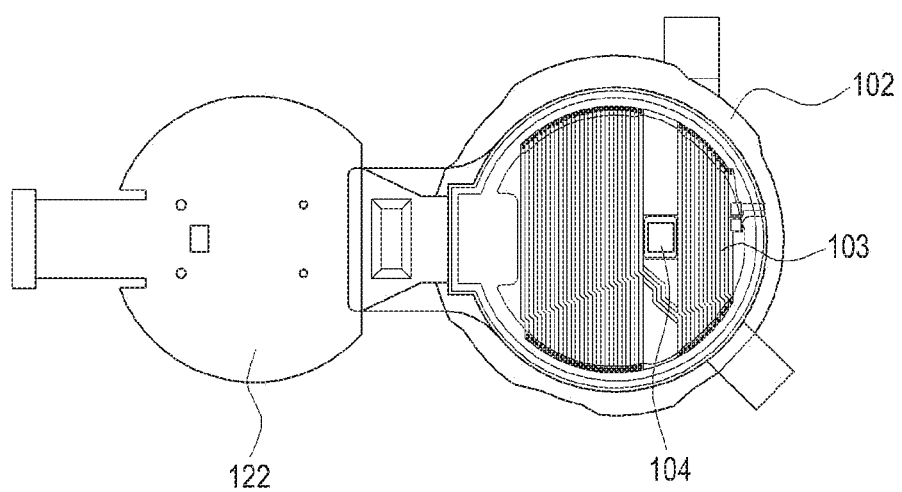
FIG. 11 is a plan view illustrating when a first antenna is seated on a display of an electronic device according to an embodiment of the present disclosure.
Figure 12:
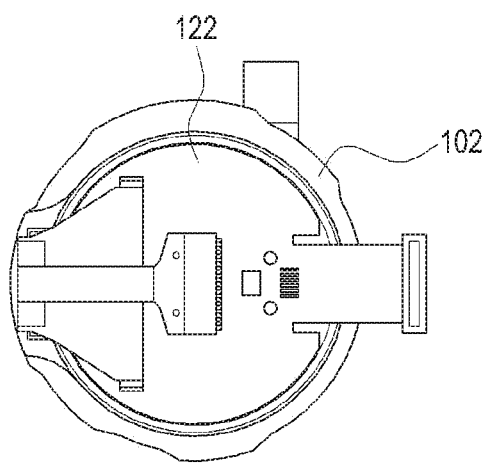
FIG. 12 is a plan view illustrating when a display and display circuit board of an electronic device are assembled together according to an embodiment of the present disclosure.

FIG. 10 is a plan view illustrating a display and a display circuit board of an electronic device according to an embodiment of the present disclosure. FIG. 11 is a plan view illustrating when a first antenna is seated on a display of an electronic device according to an embodiment of the present disclosure. FIG. 12 is a plan view illustrating when a display and display circuit board of an electronic device are assembled together according to an embodiment of the present disclosure.

Referring to FIGS. 10 to 12, and with some reference to FIG. 2, a process of assembling a first antenna of an electronic device is described according to an embodiment of the present disclosure.

The display 102 may be rotatably coupled with the display circuit board 122. The electronic part 104 may be disposed on the display 102.

The first antenna 103 may be seated on the display 102 except for the portion where the electronic part 104 is disposed.

The display circuit board 122 is rotated about the display 102, covering the first antenna 103. As the first antenna 103 is positioned between the display 102 and the display circuit board 122, the first antenna 103 may emit radio signals towards a side surface of the housing 101, and the radio signal travels around the display 102 and the battery 105, leading to an enhanced capability of emission of the radio signal to the outside of the housing 101.

Figure 13:
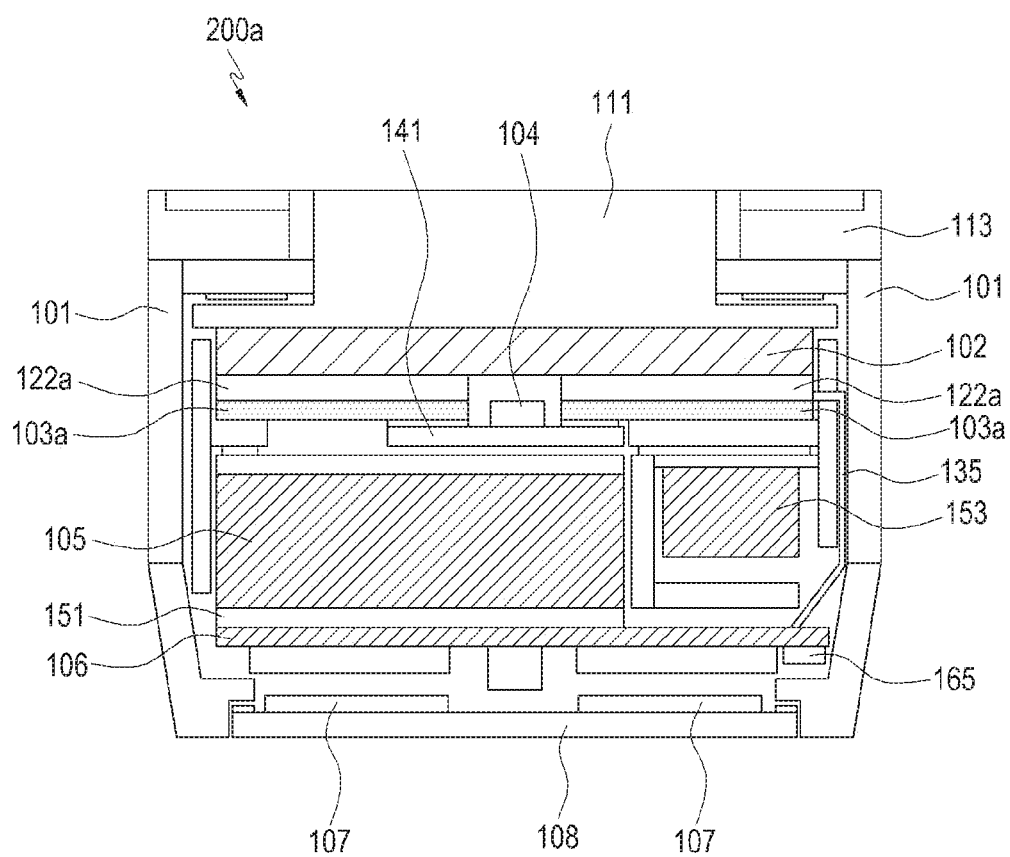
FIG. 13 is a cross-sectional view illustrating an electronic device according to an embodiment of the present disclosure.

FIG. 13 is a cross-sectional view illustrating an electronic device according to an embodiment of the present disclosure.

Referring to FIG. 13, an electronic device 200a may include a housing 101, a display 102, a first antenna 103a, a display circuit board 122a, a battery 105, a circuit board 106, a wireless charging antenna 107, and a second antenna 165.

The housing 101 may receive various electronic parts, such as the display 102, the first antenna 103a, the second antenna 165, the display circuit board 122a, the battery 105, the circuit board 106, and the wireless charging antenna 107.

The display 102 may be coupled to a lower surface of the front cover 111.

The display circuit board 122a may be attached to a lower surface of the display 122.

The first antenna 103a may be provided between the display circuit board 122a and the battery 105, and may send or receive radio signals in an MST manner.

The battery 105 may be disposed at the rear of the first antenna 103a.

The circuit board 106 may be disposed at the rear of the battery 105, and may have mounted therein a processor and a communication module in an integrated circuit (IC) chip.

The wireless charging antenna 107 may be disposed under the circuit board 106.

The second antenna 165 may be an NFC antenna that sends or receives radio signals in an NFC manner.

Various electronic parts, such as the battery 105, the speaker 153, and the circuit board 106, may be disposed between the first antenna 103a and the second antenna 165, blocking a magnetic force between the first antenna 103a and the second antenna 165. For example, the battery 105 may include a metallic film, interfering with the travel of a magnetic force through the battery 105. The speaker 153 may include a magnetic body, interfering with the travel of a magnetic force between the first antenna 103a and the second antenna 165.

Figure 14:
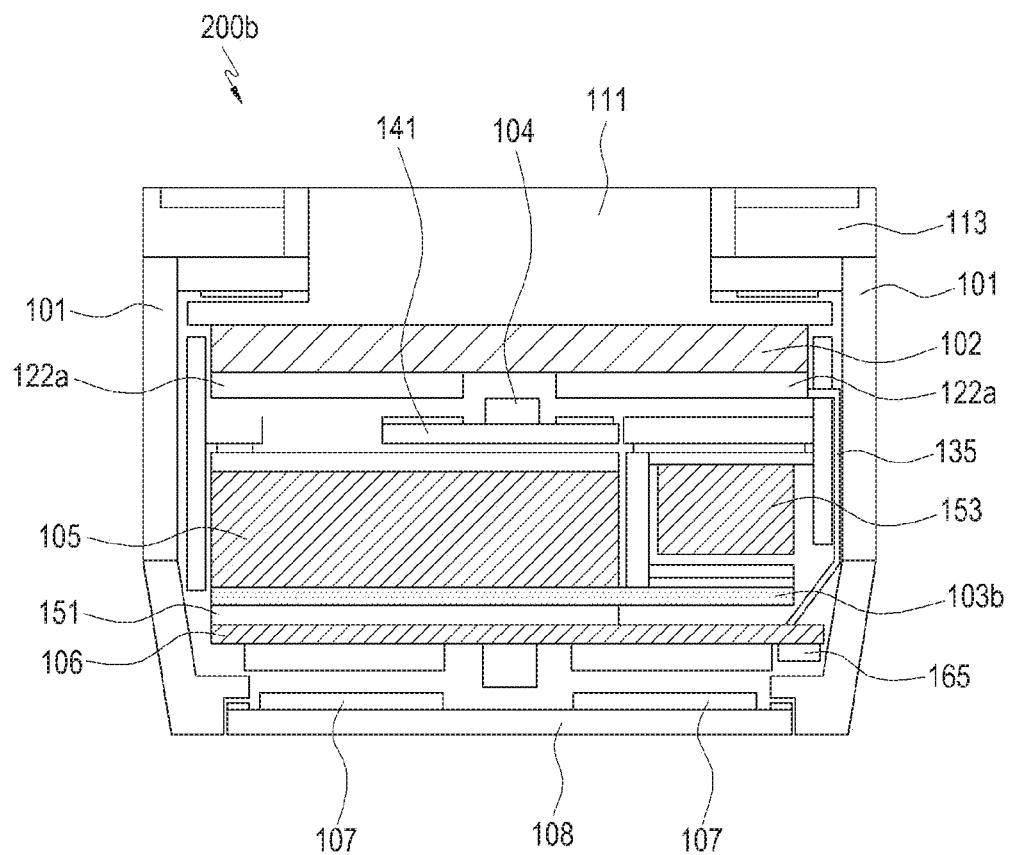
FIG. 14 is a cross-sectional view illustrating an electronic device according to an embodiment of the present disclosure.

FIG. 14 is a cross-sectional view illustrating an electronic device according to an embodiment of the present disclosure.

Referring to FIG. 14, an electronic device 200b may include a housing 101, a display 102, a first antenna 103b, a display circuit board 122a, a battery 105, a circuit board 106, and a second antenna 165.

The housing 101 may receive various electronic parts, such as the display 102, the first antenna 103b, the second antenna 165, the display circuit board 122a, the battery 105, the circuit board 106, and the wireless charging antenna 107.

The display 102 may be coupled to a lower surface of the front cover 111.

The display circuit board 122a may be attached to a lower surface of the display 102.

The battery 105 may be disposed at the rear of the display circuit board 122a.

The circuit board 106 may be disposed at the rear of the battery 105, and a processor and a communication module may be mounted in the circuit board 106 in the form of an IC chip.

The first antenna 103 may send or receive radio signals in an MST manner. The second antenna 165 may be an NFC antenna that sends or receives radio signals in an NFC manner.

The first antenna 103b may be provided between the battery 105 and the circuit board 106, and may be spaced apart from the second antenna 165, with the circuit board 106 disposed therebetween to reduce an influence of magnetic force between the first antenna 103b and the second antenna 165.

Figure 15:
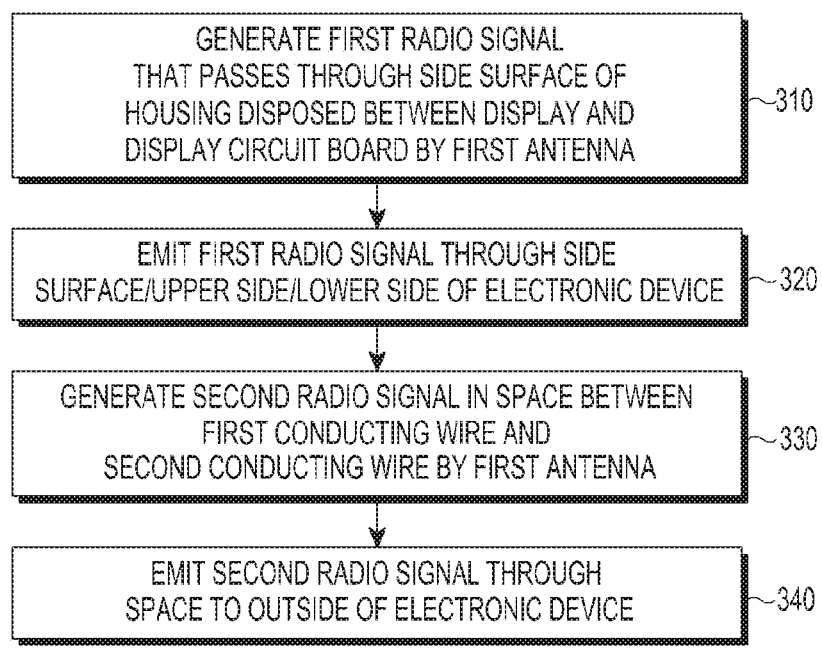
FIG. 15 illustrates operations of an electronic device according to an embodiment of the present disclosure.

FIG. 15 illustrates operations of an electronic device according to an embodiment of the present disclosure.

Referring to FIG. 15, in step 310, the first antenna generates a first radio signal that passes through a side surface of the housing disposed between the display and the display circuit board. In step 320, the first radio signal is emitted to a side surface/upper side/lower side of the electronic device. In step 330, the first antenna generates a second radio signal in a space between the first conducting wire and the second conducting wire. In step 340, the second radio signal passes through the space and the display to an outside of the electronic device. According to an embodiment of the present disclosure, steps 310 and 330 are not limited as being sequentially performed. For example, step 330 may be performed prior to step 310, or steps 310 and 330 may simultaneously be performed.

According to an embodiment of the present disclosure, the first antenna may generate a magnetic flux. For example, the first antenna may transmit payment information to an external device, such as a magnetic reader-type point of sales (POS) terminal, by generating a magnetic flux through at least one of the first conducting wire and the second conducting wire, and the electronic device may periodically send out radio signals containing payment information through the first antenna.

According to an embodiment of the present disclosure, the processor may control the first antenna to send or receive radio signals. For example, the processor may control the first antenna to send out at least one piece of payment information to the external device.

Figure 16:
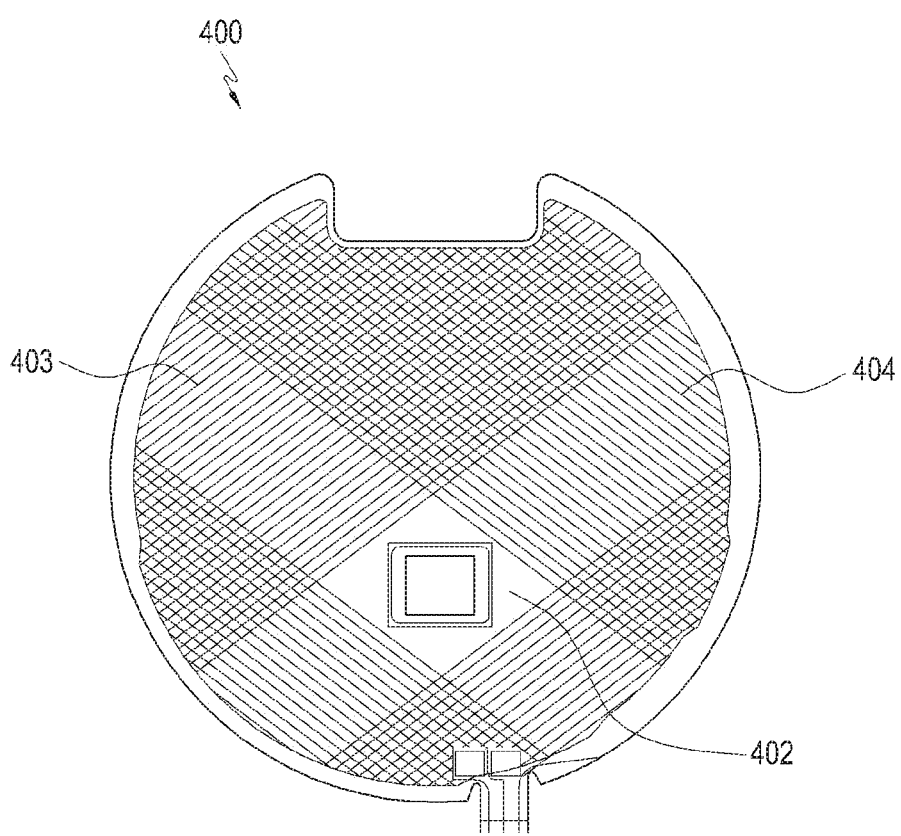
FIG. 16 is a plan view illustrating an antenna provided in an electronic device according to an embodiment of the present disclosure.
Figure 17:
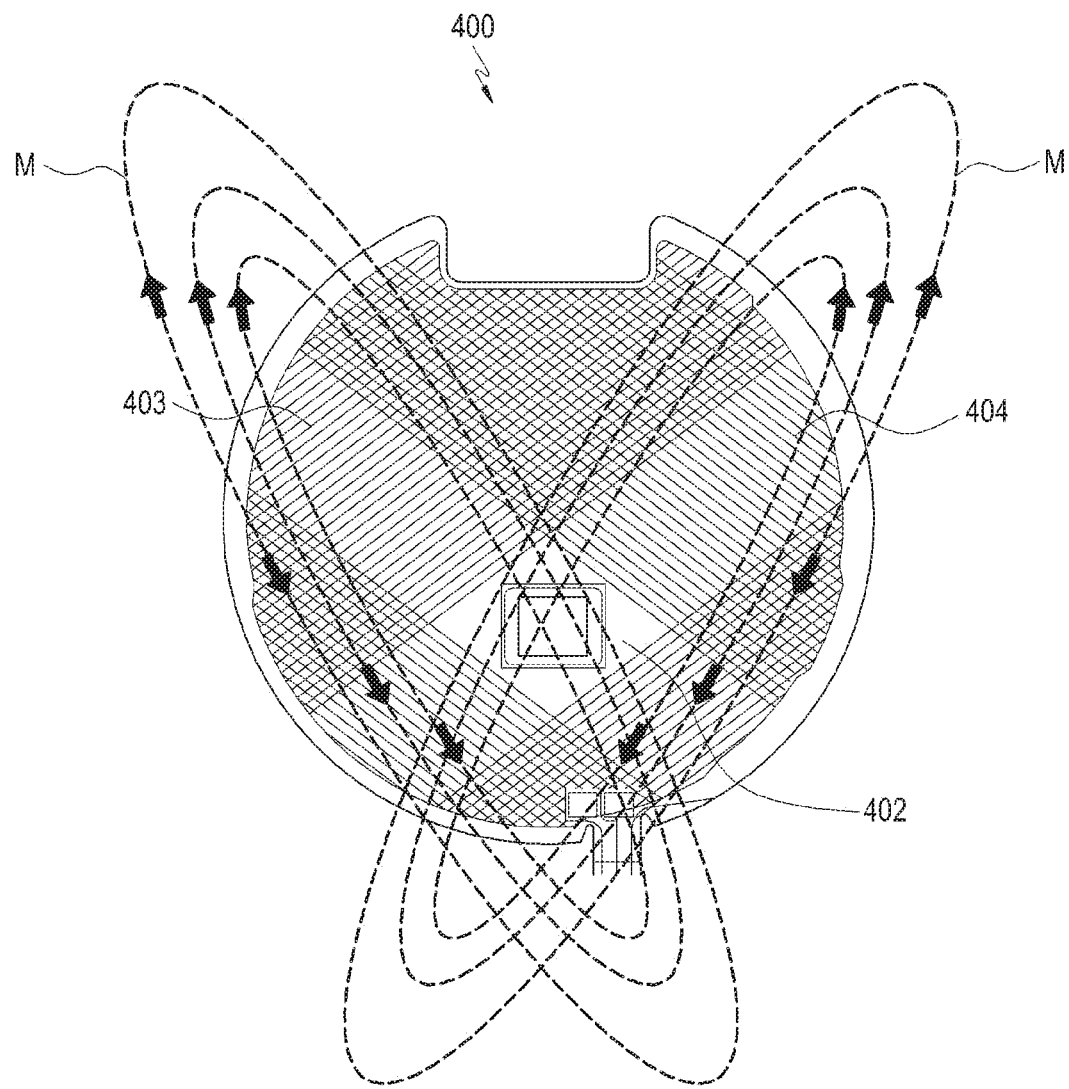
FIG. 17 is a plan view illustrating an antenna provided in an electronic device and radio signals according to an embodiment of the present disclosure.

FIG. 16 is a plan view illustrating an antenna provided in an electronic device according to an embodiment of the present disclosure. FIG. 17 is a plan view illustrating an antenna provided in an electronic device and radio signals according to an embodiment of the present disclosure.

Referring to FIGS. 16 and 17, an antenna 400 provided in an electronic device may include a magnetic body 402, a first conducting wire 403, and a second conducting wire 404.

The magnetic body 402 may be formed in a flat plate shape 402 or may be shaped as a disc.

The first conducting wire 403 may be wound around the magnetic body 402 multiple times along a first direction.

The second conducting wire 404 may be disposed on the first conducting wire 403 along a second direction that is different from the first direction. The second direction may be a direction inclined from the first direction.

The first conducting wire 403 and the second conducting wire 404 may be electrically connected with a processor through a circuit board, such as element 106 of FIG. 2). The processor may control electrical signals that are supplied to the first conducting wire 403 and the second conducting wire 404, and may perform control so that electrical signals are alternately supplied to the first conducting wire 403 and the second conducting wire 404.

The first conducting wire 403 and the second conducting wire 404 may alternately emit radio signals M under the control of the processor.

Embodiments of the present disclosure are not limited to the processor controlling electrical signals that are supplied to the first conducting wire 403 and the second conducting wire 404. For example, a separate switching structure mounted in the circuit board may perform control so that the electrical signals are alternately supplied to the first conducting wire 403 and the second conducting wire 404.

Figure 18:
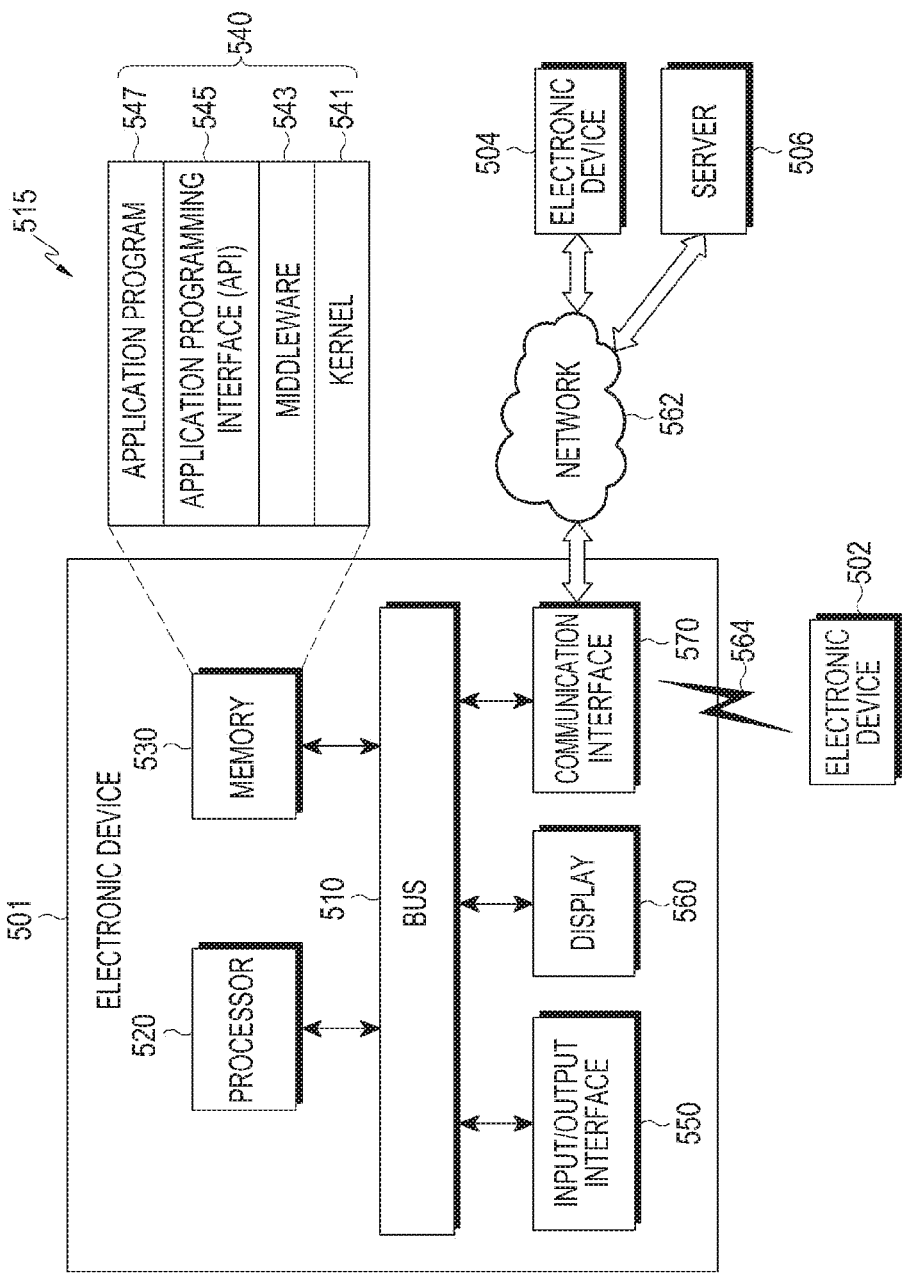
FIG. 18 illustrates a network environment of an electronic device according to an embodiment of the present disclosure.

FIG. 18 illustrates a network environment of an electronic device according to an embodiment of the present disclosure.

Referring to FIG. 18, an electronic device 501 is included in a network environment 500 and includes a bus 510, a processor 520, a memory 530, an input/output interface 550, a display 560, and a communication interface 570. In some embodiments, the electronic device 501 may exclude at least one of the components or may add another component. The bus 510 may include a circuit for connecting the components 520 to 570 with one another and transferring control messages or data between the components. The processor 520 may include one or more of a central processing unit (CPU), an application processor (AP), or a communication processor (CP), may perform control on at least one of the other components of the electronic device 501, and may perform an operation or data processing relating to communication.

The memory 530 may include a volatile and/or non-volatile memory. For example, the memory 530 may store commands or data related to at least one other component of the electronic device 501, and may store software and/or a program 540 including a kernel 541, middleware 543, an application programming interface (API) 545, and/or applications 547. At least a portion of the kernel 541, middleware 543, or API 545 may be denoted as an operating system (OS). For example, the kernel 541 may control or manage system resources used to perform operations or functions implemented in other programs, and may provide an interface that enables the middleware 543, the API 545, or the applications 547 to access the individual components of the electronic device 501 to control or manage the system resources.

The middleware 543 may function as a relay to enable the API 545 or the applications 547 to communicate data with the kernel 541, for example, and may process one or more task requests received from the applications 547 in order of priority. For example, the middleware 543 may assign a priority of using system resources of the electronic device 501 to at least one of the applications 547 and process one or more task requests. The API 545 enables the application 547 to control functions provided from the kernel 541 or the middleware 543. For example, the API 133 may include at least one interface or function for filing control, window control, image processing or text control. The input/output interface 550 may transfer commands or data input from the user or other external device to other component(s) of the electronic device 501 or may output commands or data received from other component(s) of the electronic device 501 to the user or other external devices.

The display 560 may include a liquid crystal display (LCD), a light emitting diode (LED) display, an organic light emitting diode (OLED) display, a microelectromechanical systems (MEMS) display, or an electronic paper display, may display various contents, such as text, images, videos, icons, or symbols, to the user, and may include a touchscreen and may receive a touch, gesture, proximity or hovering input using an electronic pen or a body portion of the user. For example, the communication interface 570 may set up communication between the electronic device 501 and an external electronic device, such as a first electronic device 502, a second electronic device 504, or a server 506, and may be connected with the network 562 through wireless or wired communication to communicate with the external device.

The wireless communication may include cellular communication which uses at least one of long term evolution (LTE), long term evolution-advanced (LTE-A), code division multiple access (CDMA), wideband code division multiple access (WCDMA), universal mobile telecommunication system (UMTS), wireless broadband (WiBro), and global system for mobile communication (GSM), and may include at least one of wireless fidelity (Wi-Fi), Bluetooth™, Bluetooth low power (BLE), zigbee, near field communication (NFC), magnetic secure transmission (MST), radio frequency, body area network (BAN), and global navigation satellite system (GNSS) including global positioning system (GPS), global navigation satellite system (Glonass), Beidou navigation satellite system (Beidou), Galileo, or the European global satellite-based navigation system. Hereinafter, "GPS" and "GNSS" may be interchangeably used.

The wired connection may include at least one of universal serial bus (USB), high definition multimedia interface (HDMI), recommended standard (RS)-232, power line communication (PLC), or plain old telephone service (POTS). The network 562 may include at least one of telecommunication networks, such as a local area network (LAN), or wide area network (WAN), the Internet, or a telephone network.

The first and second external electronic devices 502 and 504 each may be a device of the same or a different type from the electronic device 501. According to an embodiment of the present disclosure, all or some of operations executed on the electronic device 501 may be executed on another or multiple other electronic devices, such as the electronic devices 502 and 504 or server 506). When the electronic device 501 should perform some function or service automatically or at a request, the electronic device 501, instead of executing the function or service on its own or additionally, may request another device to perform at least some functions associated therewith. The other electronic device may execute the requested functions or additional functions and transfer a result of the execution to the electronic device 501, which may provide a requested function or service by processing the received result as it is or additionally. To that end, a cloud computing, distributed computing, or client-server computing technique may be used.

Figure 19:
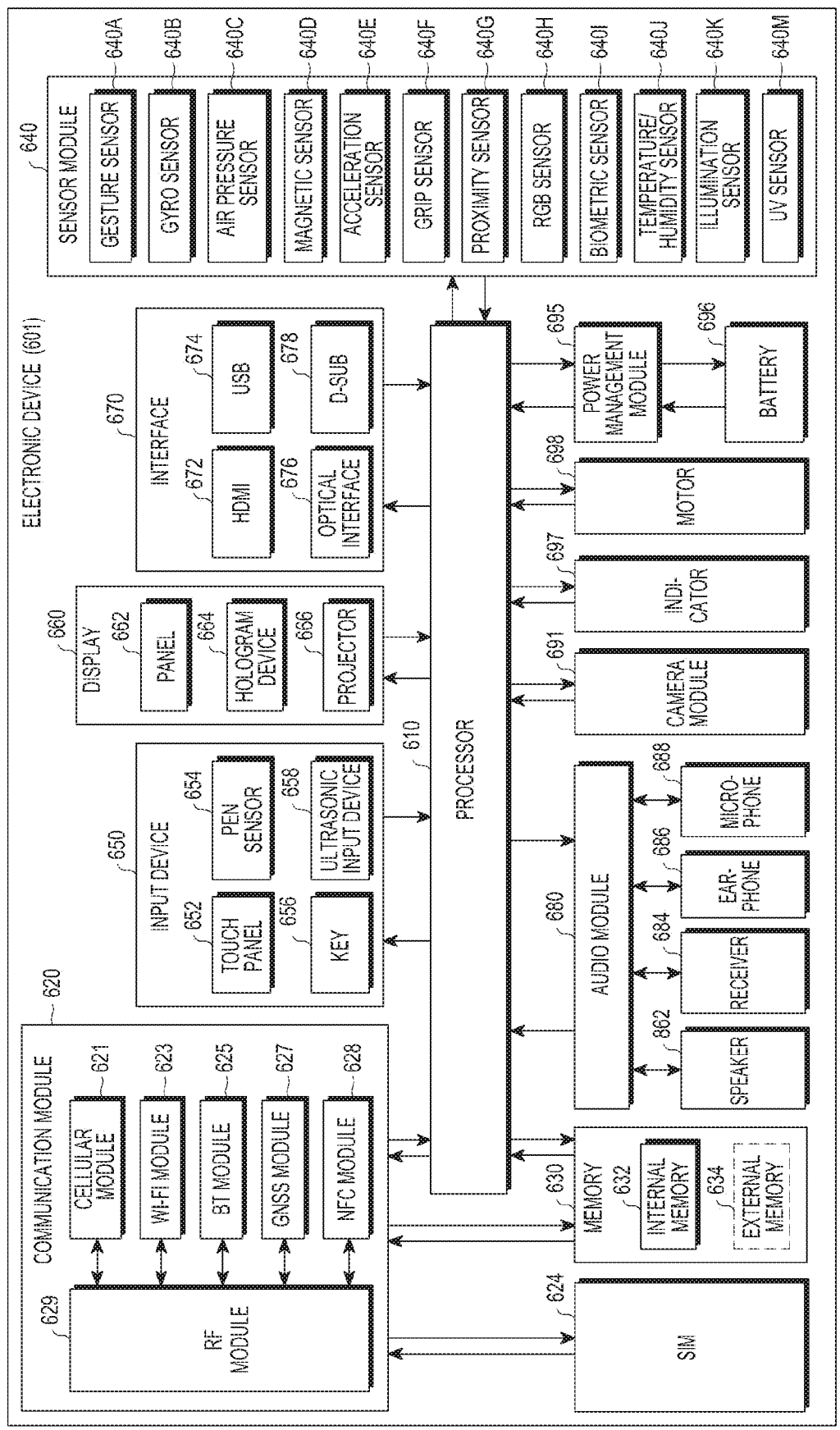
FIG. 19 illustrates an electronic device according to an embodiment of the present disclosure.

FIG. 19 illustrates an electronic device 601 according to an embodiment of the present disclosure. The electronic device 601 may include all or part of the configuration of the electronic device 601 shown in FIG. 18 and may include one or more processors, 610, a communication module 620, a subscriber identification module (SIM) card 624, a memory 630, a sensor module 640, an input device 650, a display 660, an interface 670, an audio module 680, a camera module 691, a power management module 695, a battery 696, an indicator 697, and a motor 698. The processor 610 may control multiple hardware and software components connected to the processor 610 by running an operating system or application programs, may process and compute various data, may be implemented in a system on chip (SoC) 610, and may further include a graphic processing unit (GPU) and/or an image signal processor. The processor 610 may include at least some of the components shown in FIG. 19, and may load a command or data received from a non-volatile memory on a volatile memory, process the command or data, and store resultant data in the non-volatile memory.

The communication module 620 may have the same or similar configuration to the communication interface 670 and may include a cellular module 621, a wireless fidelity (Wi-Fi) module 623, a Bluetooth (BT) module 625, a GNSS module 627, a NFC module 628, and an RF module 629. The cellular module 621 may provide voice call, video call, text, or Internet services through a communication network, may perform identification or authentication on the electronic device 601 in the communication network using the SIM card 624, may perform at least some of the functions providable by the processor 610, and may include a CP. According to an embodiment of the present disclosure, at least two of the cellular module 621, the Wi-Fi module 623, the Bluetooth module 625, the GNSS module 627, and the NFC module 628 may be included in a single integrated circuit (IC) or an IC package. The RF module 629 may communicate RF signals and may include a transceiver, a power amp module (PAM), a frequency filter, a low noise amplifier (LNA), or an antenna.

According to an embodiment of the present disclosure, at least one of the cellular module 621, the Wi-Fi module 623, the Bluetooth module 625, the GNSS module 627, and the NFC module 628 may communicate RF signals through a separate RF module. The SIM card 624 may include a card including a SIM, or an embedded SIM, and may contain unique identification information, such as an integrated circuit card identifier (ICCID) or subscriber information, such as an international mobile subscriber identity (IMSI).

The memory 630 may include an internal memory 632 and an external memory 634. The internal memory 632 may include at least one of a volatile memory, such as a dynamic RAM (DRAM), a static RAM (SRAM), and a synchronous dynamic RAM (SDRAM), or a non-volatile memory, such as a one time programmable ROM (OTPROM), a programmable ROM (PROM), an erasable and programmable ROM (EPROM), an electrically erasable and programmable ROM (EEPROM), a mask ROM, a flash ROM, a flash memory, such as a NAND or a NOR flash, a hard drive, and solid-state drive (SSD). The external memory 634 may include a flash drive, such as a compact flash (CF) memory, a secure digital (SD) memory, a micro-SD memory, a min-SD memory, an extreme digital (xD) memory, a multi-media card (MMC), or a memory Stick™. The external memory 634 may be functionally or physically connected with the electronic device 601 via various interfaces.

For example, the sensor module 640 may measure a physical quantity or detect an operational state of the electronic device 601, and may convert the measured or detected information into an electrical signal. The sensor module 640 may include at least one of a gesture sensor 640A, a gyro sensor 640B, an atmospheric pressure sensor 640C, a magnetic sensor 640D, an acceleration sensor 640E, a grip sensor 640F, a proximity sensor 640G, a color sensor 640H, such as a red-green-blue (RGB) sensor, a biometric sensor 640I, a temperature/humidity sensor 640J, an illumination sensor 640K, and an ultra violet (UV) sensor 640M.

Additionally or alternatively, the sensing module 640 may include an e-nose sensor, an electromyography (EMG) sensor, an electroencephalogram (EEG) sensor, an electrocardiogram (ECG) sensor, an infrared (IR) sensor, an iris sensor, a finger print sensor, and a control circuit for controlling at least one of the sensors included in the sensing module. According to an embodiment of the present disclosure, the electronic device 601 may further include a processor configured to control the sensor module 640 as part of the processor 610 or separately from the processor 610, and may control the sensor module 640 while the processor 610 is in a sleep mode.

The input unit 650 may include a touch panel 652, a (digital) pen sensor 654, a key 656, and an ultrasonic input device 658. The touch panel 652 may use at least one of capacitive, resistive, infrared, or ultrasonic methods, and may further include a control circuit and a tactile layer that provides a user with a tactile reaction. The (digital) pen sensor 654 may include a part of a touch panel or a separate sheet for recognition. The key 656 may include a physical button, optical key or key pad. The ultrasonic input device 658 may sense an ultrasonic wave generated from an input tool through a microphone 688 to identify data corresponding to the sensed ultrasonic wave.

The display 660 may include a panel 662, a hologram device 664, a projector 665, and/or a control circuit for controlling the same. The panel 662 may be implemented to be flexible, transparent, or wearable. The panel 662, together with the touch panel 652, may be configured in one or more modules, and may include a pressure sensor that may measure the strength of a pressure by the user's touch. The pressure sensor may be implemented in a single body with the touch panel 652 or may be implemented in one or more sensors separate from the touch panel 652. The hologram device 664 may project three dimensional (3D) images (holograms) in the air by using light interference. The projector 665 may display an image by projecting light onto a screen. The screen may be located inside or outside of the electronic device 601. The interface 670 may include a high definition multimedia interface (HDMI) 672, a USB 674, an optical interface 676, and a D-subminiature (D-sub) 678, may be included in the communication interface 570 shown in FIG. 18, and may include a mobile high-definition link (MHL) interface, a secure digital (SD) card/multimedia card (MMC) interface, or infrared data association (IrDA) standard interface.

The audio module 680 may convert a sound signal into an electrical signal and vice versa. At least a part of the audio module 680 may be included in the input/output interface 550 shown in FIG. 18. The audio module 680 may process sound information input or output through a speaker 682, a receiver 684, an earphone 686, or a microphone 688. The camera module 691 may capture still images and videos, and may include one or more image sensors, such as front and back sensors, a lens, an image signal processor (ISP), and a flash such as an LED or xenon lamp. The power manager module 695 may manage power of the electronic device 601 and may include a power management Integrated circuit (PMIC), a charger IC, and a battery gauge. The PMIC may have a wired and/or wireless recharging scheme. The wireless charging scheme may include a magnetic resonance, magnetic induction, or electromagnetic wave based scheme, and an additional circuit, such as a coil loop, a resonance circuit, or a rectifier may be added for wireless charging. The battery gauge may measure an amount of remaining power of the battery 696, a voltage, a current, or a temperature while the battery 696 is being charged. The battery 696 may include a rechargeable battery or a solar battery.

The indicator 697 may indicate a particular state of the electronic device 601 or a part of the electronic device, such as a booting, message, or recharging state. The motor 698 may convert an electric signal to a mechanical vibration and may generate a vibrational or haptic effect. The electronic device 601 may include a mobile TV supporting device, such as a GPU, that may process media data as per digital multimedia broadcasting (DMB), digital video broadcasting (DVB), or mediaFlo™ standards. Each of the aforementioned components of the electronic device may include one or more parts, and a name of the part may vary with a type of the electronic device. According to embodiments, the electronic device 601 may exclude some elements or include more elements, or some of the elements may be combined into a single entity that may perform the same function as by the elements before combined.

Figure 20:
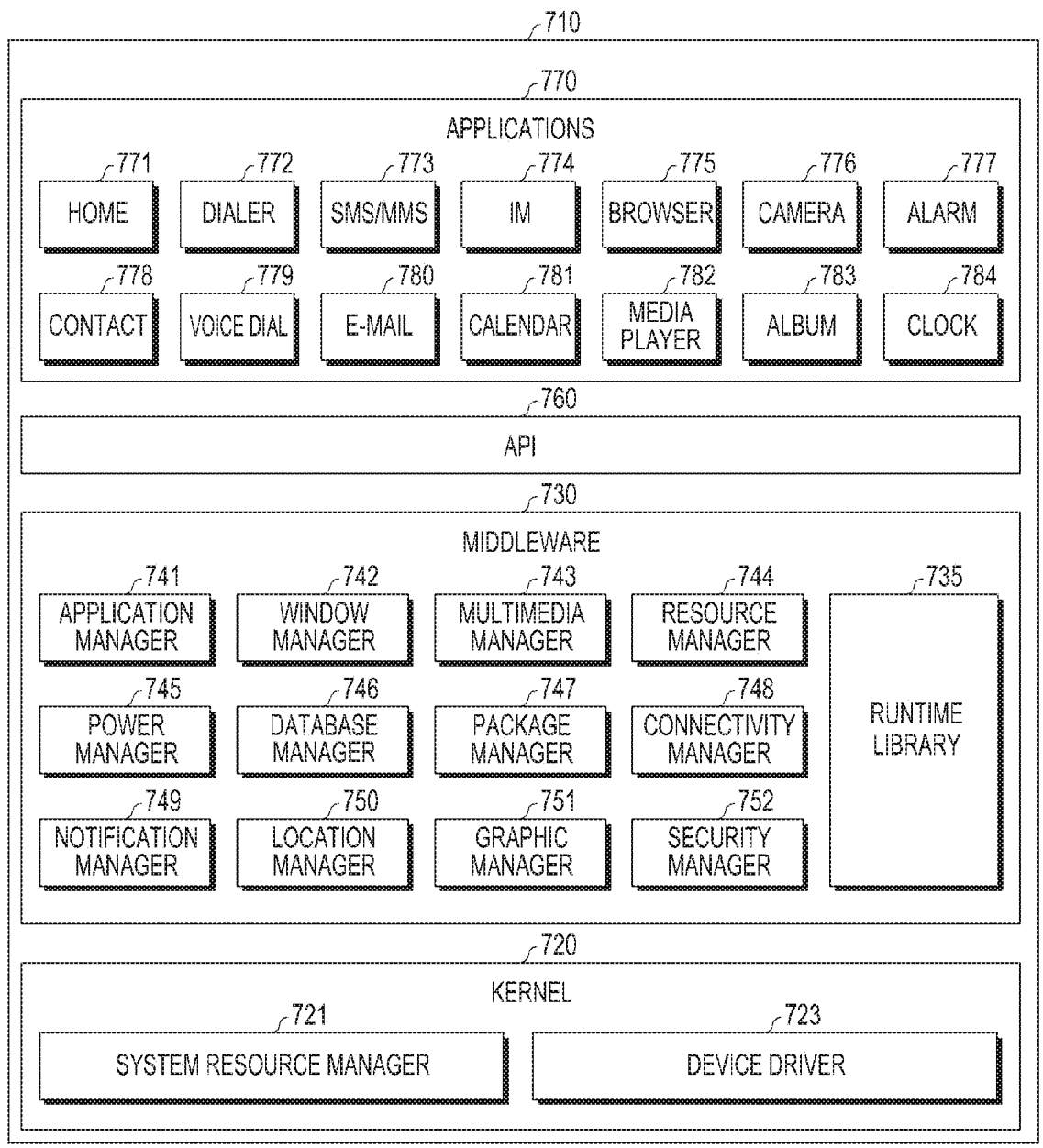
FIG. 20 illustrates a program of an electronic device according to an embodiment of the present disclosure.

FIG. 20 illustrates a program module according to an embodiment of the present disclosure. The program module 710 may include an OS controlling resources related to the electronic device and/or various applications driven on the OS, such as Android™, iOS™, Windows™, Symbian™, Tizen™, or Bada™.

Referring to FIG. 20, the program module 710 may include a kernel 720, middleware 730, an API 760, and/or applications 770. At least a part of the program module 710 may be preloaded on the electronic device or may be downloaded from an external electronic device.

The kernel 720 may include a system resource manager 721 and a device driver 723. The system resource manager 721 may perform control, allocation, or recovery of system resources and may include a process managing unit, a memory managing unit, or a file system managing unit. The device driver 723 may include a display driver, a camera driver, a Bluetooth driver, a shared memory driver, a USB driver, a keypad driver, a Wi-Fi driver, an audio driver, and an inter-process communication (IPC) driver. The middleware 730 may provide various functions to the application 770 through the API 760 so that the applications 770 may use limited system resources in the electronic device or provide functions jointly required by the applications 770. The middleware 730 may include at least one of a runtime library 735, an application manager 741, a window manager 742, a multimedia manager 743, a resource manager 744, a power manager 745, a database manager 746, a package manager 747, a connectivity manager 748, a notification manager 749, a location manager 750, a graphic manager 751, and a security manager 752.

The runtime library 735 may include a library module used by a compiler in order to add a new function through a programming language while at least one of the applications 770 is being executed. The runtime library 735 may perform input/output management, memory management, or arithmetic function processing. The application manager 741 may manage the life cycle of the applications 770. The window manager 742 may manage GUI resources used on the screen. The multimedia manager 743 may procure formats necessary to play media files and use a codec appropriate for a format to perform encoding or decoding on media files. The resource manager 744 may manage the source code or memory space of the applications 770. The power manager 745 may manage the battery capability or power and provide power information necessary for the operation of the electronic device. According to an embodiment of the present disclosure, the power manager 745 may interwork with a basic input/output system (BIOS). The database manager 746 may generate, search, or vary a database to be used in the applications 770. The package manager 747 may manage installation or update of an application that is distributed in the form of a package file.

The connectivity manager 748 may manage wireless connectivity. The notification manager 749 may provide an event, such as an arrival message, appointment, or proximity alert, to the user. The location manager 750 may manage locational information on the electronic device. The graphic manager 751 may manage graphic effects to be offered to the user and their related user interface. The security manager 752 may provide system security or user authentication. According to an embodiment of the present disclosure, the middleware 730 may include a telephony manager for managing the voice or video call function of the electronic device or a middleware module able to form a combination of the functions of the above-described elements, may provide a module specified according to the type of the operating system, and may dynamically omit some existing components or add new components. The API 760 may be a set of API programming functions and may have different configurations depending on operating systems. For example, in the case of Android or iOS, one API set may be provided per platform, and in the case of Tizen, two or more API sets may be offered per platform.

The applications 770 may include a home 771, dialer 772, short message service (SMS)/multimedia messaging service (MMS) 773, instant message (IM) 774, browser 775, camera 776, alarm 777, contact 778, voice dial 779, email 980, calendar 981, media player 982, album 983, clock 984, heath-care, such as measuring the degree of workout or blood sugar, provision of environmental information, such as air pressure, moisture, and temperature information, and an information exchanging application, supporting information exchange between the electronic device and an external electronic device.

Examples of the information exchange application may include, but are not limited to, a notification relay application for transferring specific information to the external electronic device, and a device management application for managing the external electronic device. For example, the notification relay application may transfer notification information generated by another application of the electronic device to the external electronic device or receive notification information from the external electronic device and provide the received notification information to the user. The device management application may install, delete, or update a function, such as turn-on/turn-off all or part of the external electronic device or adjusting the brightness of the display, of the external electronic device communicating with the electronic device or an application operating on the external electronic device. The applications 770 may include a health-care application of a mobile medical device designated according to an attribute of the external electronic device, and may include an application received from the external electronic device. At least a portion of the program module 710 may be implemented in software, firmware, hardware, or a combination of at least two thereof, and may include a module, program, routine, command set, or process for performing one or more functions.

As used herein, the term "module" includes a unit configured in hardware, software, or firmware and may be interchangeably used with other terms, such as a logic, logic block, part, or circuit. The module may be a single integral part or a minimum unit or part of performing one or more functions. The module may be implemented mechanically or electronically and may include an application-specific integrated circuit (ASIC) chip, field-programmable gate arrays (FPGAs), or programmable logic device, that has been known or to be developed in the future as performing some operations.

According to an embodiment of the present disclosure, at least a part of the device or operations may be implemented as instructions stored in a computer-readable storage medium in the form of a program module. The instructions, when executed by a processor, may enable the processor to perform a corresponding function. The computer-readable medium may include a hard disk, a floppy disc, a magnetic medium, an optical recording medium, such as compact disc-read only memory (CD-ROM), a digital versatile disk (DVD), a floptical disk, or an embedded memory. The instruction may include a code created by a compiler or a code executable by an interpreter. Modules or programming modules in accordance with embodiments of the present disclosure may include at least one or more of the aforementioned components, omit some of the components, or further include other additional components. Operations performed by modules, programming modules or other components in accordance with embodiments of the present disclosure may be performed sequentially, in parallel, repeatedly or heuristically, or at least some operations may be executed in a different order or omitted or other operations may be added.

Figure 21:
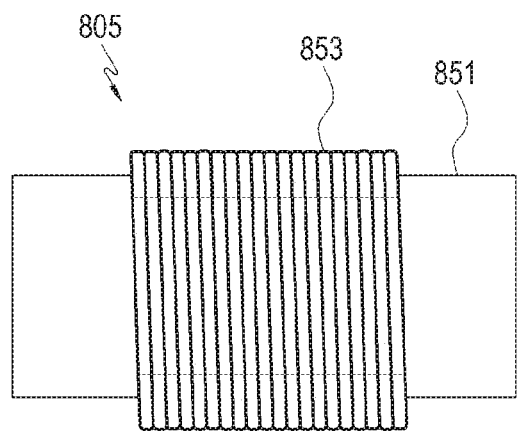
FIG. 21 is a plan view illustrating a second antenna provided in an electronic device according to an embodiment of the present disclosure.
Figure 22:
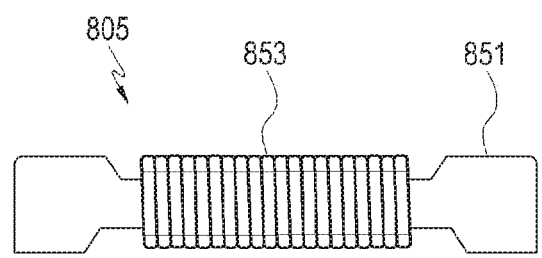
FIG. 22 is a side view illustrating a second antenna provided in an electronic device according to an embodiment of the present disclosure.
Figure 23:
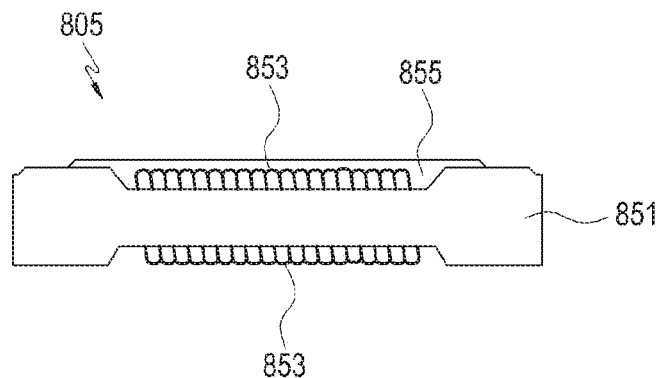
FIG. 23 is a cross-sectional view illustrating a second antenna provided in an electronic device according to an embodiment of the present disclosure.
Figure 24:
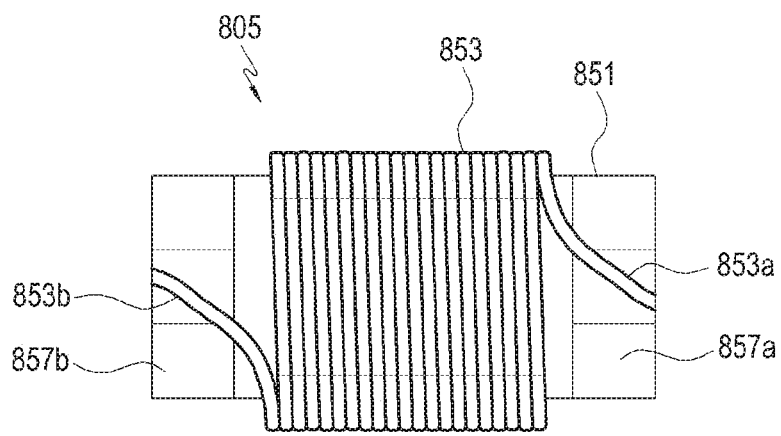
FIG. 24 is a plan view illustrating electrical connections of a second antenna provided in an electronic device according to an embodiment of the present disclosure.

FIG. 21 is a plan view illustrating a second antenna provided in an electronic device according to an embodiment of the present disclosure. FIG. 22 is a side view illustrating a second antenna provided in an electronic device according to an embodiment of the present disclosure. FIG. 23 is a cross-sectional view illustrating a second antenna provided in an electronic device according to an embodiment of the present disclosure. FIG. 24 is a plan view illustrating electrical connections of a second antenna provided in an electronic device according to an embodiment of the present disclosure.

Referring to FIGS. 21 to 24, a second antenna 805 may include a magnetic body 851 and a conducting wire 853.

The magnetic body 851 may be formed in a stick shape, have a longitudinal direction, and include ferrite.

The conducting wire 853 may be wound around the magnetic body 851 multiple times in a first direction of a display that crosses the longitudinal direction of the magnetic body 851.

The conducting wire 853 may be formed of copper (Cu), and may also be formed of a copper alloy, silver (Ag), or other conductive materials.

According to an embodiment of the present disclosure, the conducting wire 853 may be surrounded by a resin 855, such as polyurethane, polyamide, or a mixture of polyurethane and polyamide. The resin 855 may surround an outer surface of the conducting wire 853 by an ultraviolet (UV) bonding scheme.

According to an embodiment of the present disclosure, a first terminal 857a may be disposed at a first edge of the magnetic body 851, and a second terminal 857b may be disposed at a second edge of the magnetic body 851. The first and second terminals 857a and 857b may be formed of at least one of silver (Ag), nickel (Ni), and tin (Sn), and may also be formed of other conductive materials, such as copper (Cu).

According to an embodiment of the present disclosure, the conducting wire 853 may include a first end 853a attached to the first terminal 857a, and a second end 853b attached to the second terminal 857b.

Figure 25:
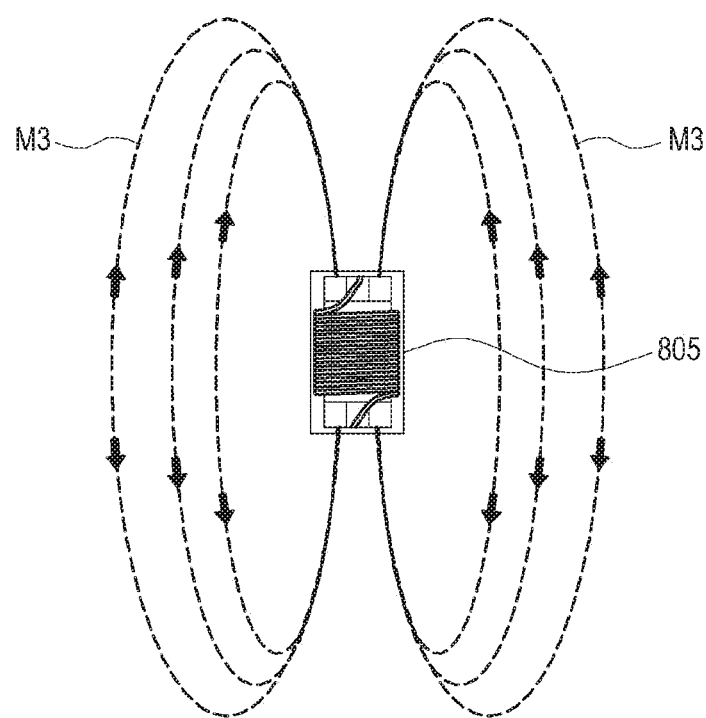
FIG. 25 is a plan view illustrating a second antenna provided in an electronic device and radio signals according to an embodiment of the present disclosure.

FIG. 25 is a plan view illustrating a second antenna provided in an electronic device and radio signals according to an embodiment of the present disclosure.

Referring to FIG. 25, a radio signal M3 may be generated at both ends of the second antenna 805 and in a direction perpendicular to the first direction of the conducting wire 853 that is wound around the magnetic body 851. For example, the radio signal M3 may be generated from the first end of the second antenna 805 and may be connected through an outside of the second antenna 805 to the second end of the second antenna 805.

According to an embodiment of the present disclosure, the radio signal M3 may be generated from the second end of the second antenna 805 and connected through outside the second antenna 805 to the first end of the second antenna 805 according to AC that applies to the conducting wire.

Figure 26:
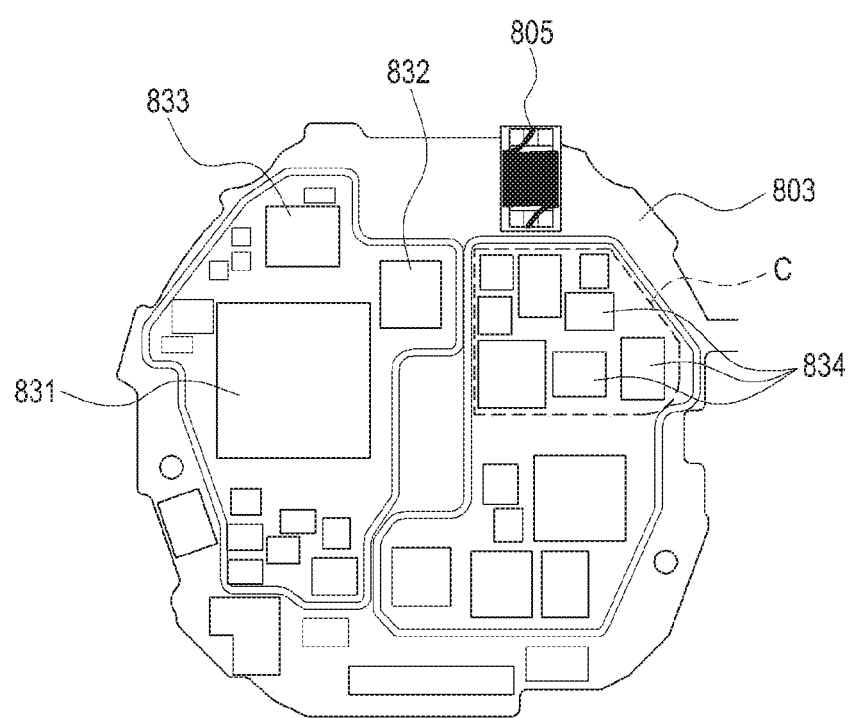
FIG. 26 is a plan view illustrating when a second antenna provided in an electronic device is disposed on a circuit board according to an embodiment of the present disclosure.

FIG. 26 is a plan view illustrating when a second antenna provided in an electronic device is disposed on a circuit board according to an embodiment of the present disclosure.

Referring to FIG. 26, a second antenna 805 provided in an electronic device may be disposed on a circuit board 803.

A processor 831 and communication modules 832, 833, and 834 may be mounted on the circuit board 803. The communication modules 832, 833, and 834 may include an NFC module 832, a Wi-Fi module 833, and an RF module 834. The NFC module 832 may be electrically connected with the second antenna 805. The RF module 834 may be disposed adjacent to the second antenna 805.

The second antenna 805 may be mounted at an edge of the circuit board 803 in a compact size that reduces the space for mounting the second antenna 805 in the electronic device, resulting in a slim electronic device.

Figure 27:
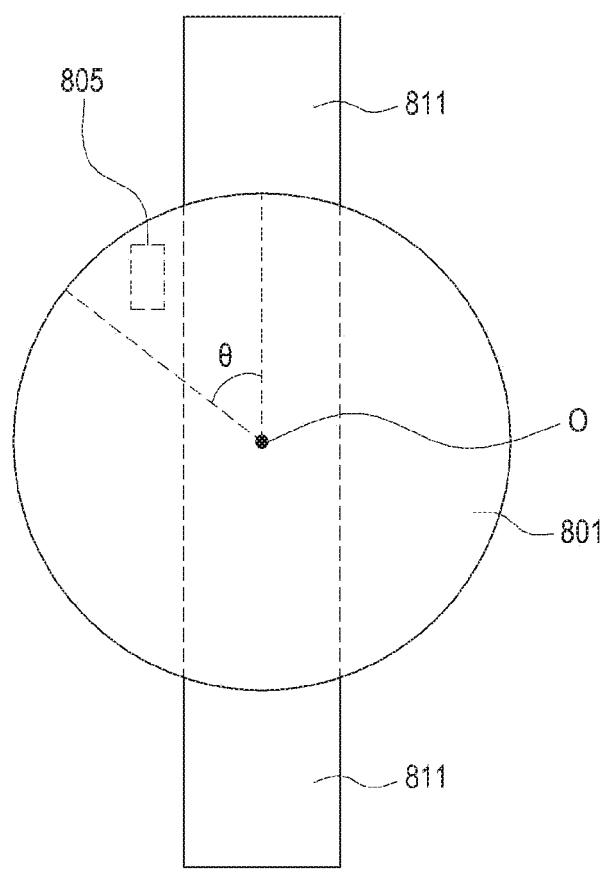
FIG. 27 is a plan view illustrating a position of a second antenna provided in an electronic device according to an embodiment of the present disclosure.

FIG. 27 is a plan view illustrating a position of a second antenna provided in an electronic device according to an embodiment of the present disclosure.

Referring to FIG. 27, an electronic device may include a housing 801, wearing parts 811, and a second antenna 805, and may be a wearable watch.

A front surface of the housing 801 may be formed in a circular shape, but the present disclosure is not limited thereto, and the front surface of the housing 801 may be formed in other shapes, such as a rectangle.

The wearing parts 811 have a longitudinal direction, enabling the electronic device to be worn on the user's wrist.

The second antenna 805, as viewed from the front surface of the housing 801, may be positioned away from the center O of the housing 801 within an acute angle (θ) range with respect to the wearing parts 811. For example, the acute angle θ may be 0 degrees to 30 degrees, as viewed from the front surface of the housing 801, when measured to the left of the wearing parts 811 on the center O of the housing 801.

According to an embodiment of the present disclosure, the front surface of the housing 801 may be implemented to include an analog watch having 1 o'clock to 12 o'clock positions that are radially arranged. In the analog watch, an hour hand and a minute hand may rotate. The second antenna 805, as viewed from the front surface of the housing 801, may be placed between the 11 o'clock position and the 12 o'clock position.

According to an embodiment of the present disclosure, the magnetic body. 853 of the second antenna 805 may be parallel to a longitudinal direction of the wearing parts 811.

Figure 28:
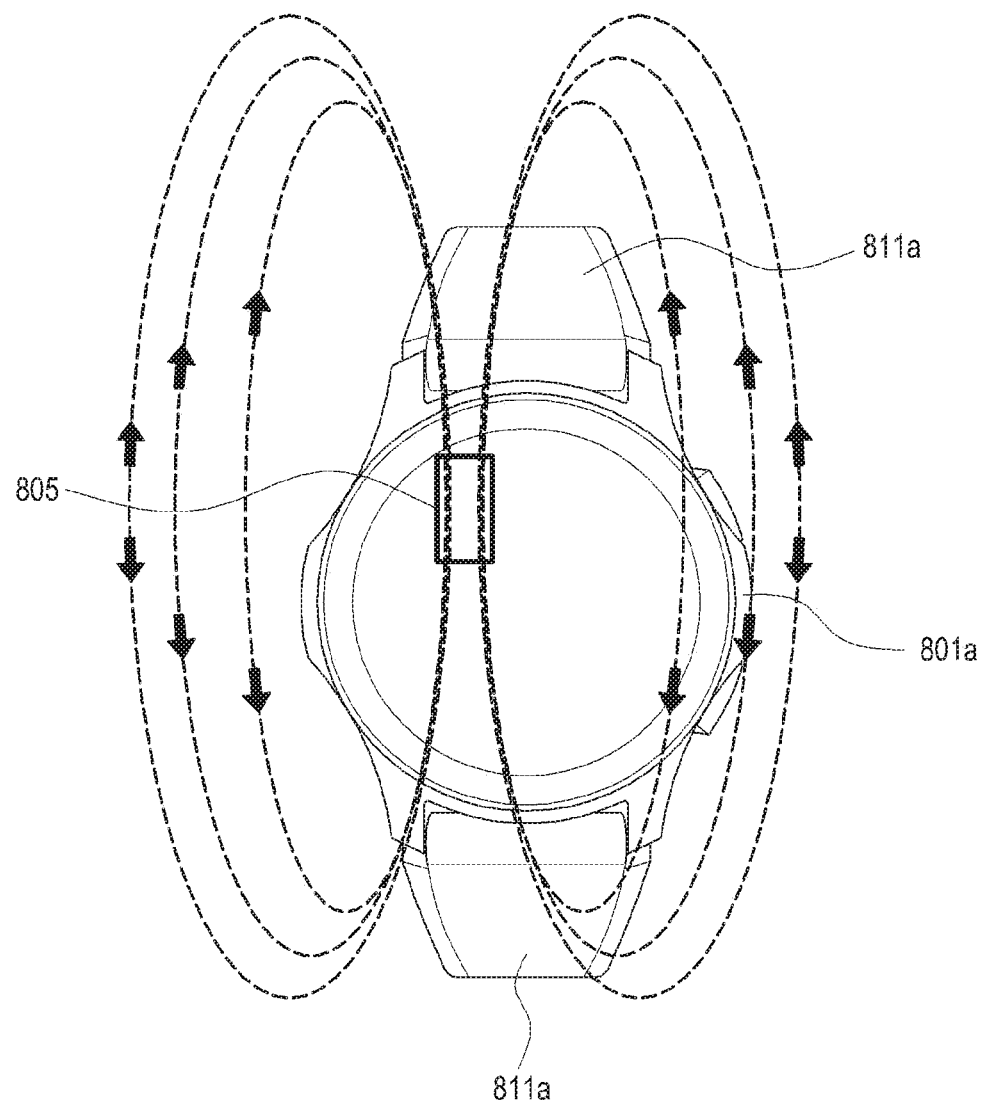
FIG. 28 is a plan view illustrating an electronic device and radio signals according to an embodiment of the present disclosure.
Figure 29:
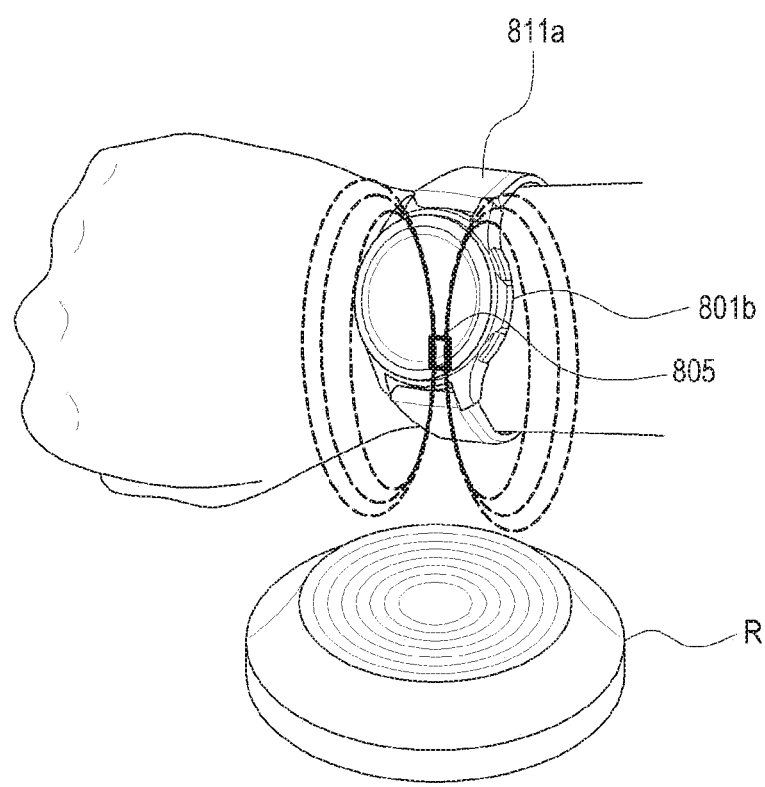
FIG. 29 is a perspective view illustrating an electronic device and radio signals according to an embodiment of the present disclosure.

FIG. 28 is a plan view illustrating an electronic device and radio signals according to an embodiment of the present disclosure. FIG. 29 is a perspective view illustrating an electronic device and radio signals according to an embodiment of the present disclosure.

Referring to FIGS. 28 and 29, an electronic device may include a housing 801a, wearing parts 811a, and a second antenna 805. The same or similar elements to those according to the above-described embodiments are excluded from the detailed description.

The second antenna 805, as viewed from the front surface of the housing 801a and with reference to the parameters in FIG. 27, may be positioned away from the center O of the housing 801a within an acute angle (θ) range with respect to the wearing parts 811a, and may generate a radio signal in a direction that is inclined at the acute angle θ from the longitudinal direction of the wearing parts 811a.

When the user wearing the electronic device approaches the reader R, the longitudinal direction of the wearing parts 811a may not be perpendicular to a surface of the reader R. As the second antenna 805 generates a radio signal in a direction that is inclined at an acute angle from a longitudinal direction of the wearing parts 811a, the direction of the radio signal may be rendered perpendicular to a surface of the reader R. As such, the scan or reading rate of the reader may be increased by the radio signal.

An electronic device may include a battery, at least one first antenna provided at a front of the battery, and at least one second antenna provided at a rear of the battery, wherein the first antenna and the second antenna may include a magnetic body and a conducting wire that is wound around the magnetic body multiple times.

The first antenna may include an MST antenna, and the second antenna includes an NFC antenna.

The first antenna and the second antenna each may be shaped as a solenoid that is formed as the conducting wire is wound around the magnetic body.

The first antenna may be provided between the battery and a display of the electronic device, and the second antenna may be provided on a circuit board that is provided at a rear of the battery.

The second antenna may be provided between the battery and the circuit board.

The electronic device may further include a circuit board disposed opposite the first antenna with respect to the battery and a wireless charging antenna disposed under the circuit board, wherein the battery may block a magnetic force between the first antenna and the wireless charging antenna.

The electronic device may further comprise a connector connecting the first antenna with a circuit board, wherein the first antenna may receive an electrical signal through the connector.

An electronic device may include a battery and at least one antenna provided at a front of the battery, wherein the at least one antenna may include a first conducting wire that is wound multiple times in a first axial direction and a second conducting wire that is spaced apart from the first conducting wire, forms a space, and is wound multiple times in the first axial direction.

The electronic device may further include at least one other antenna provided at a rear of the battery, wherein the at least one antenna includes an MST antenna, and the at least one other antenna includes an NFC antenna.

The first conducting wire may be electrically connected with the second conducting wire.

The at least one antenna may generate a radio signal that passes through a display via the space between the first conducting wire and the second conducting wire.

An electronic part may be disposed in the space, and may include an illumination sensor or a camera.

The electronic device may further include a display and a display circuit board at a front of the battery, wherein the at least one antenna may be disposed between the display and the display circuit board.

The electronic device may further include a display and a display circuit board at a front of the battery, wherein the at least one antenna may be disposed at a rear of the display circuit board.

The at least one antenna may be disposed between a rear of the battery and a circuit board provided at the rear of the battery.

A method for operating an electronic device may include generating a first radio signal that passes through a side surface of a housing of the electronic device by a first antenna disposed between a display and a display circuit board of the electronic device, emitting the first radio signal through a side surface, upper side, or lower side of the electronic device, winding a first conducting wire and a second conducting wire, spacing the first conducting wire and the second conducting wire away from the first antenna, and generating a second radio signal in a space between the first conducting wire and the second conducting wire, and emitting the second radio signal through the space from the electronic device.

An antenna provided in an electronic device may include a magnetic body, a first conducting wire wound around the magnetic body along a first direction, and a second conducting wire disposed on the first conducting wire and wound along a second direction different from the first direction.

The electronic device may further include a housing, a circuit board disposed inside the housing and having the second antenna mounted thereon, and an wearing part coupled to the housing and having a longitudinal direction and put on a user's wrist, wherein the second antenna, as viewed from a front surface of the housing, may be positioned away from a center of the housing within an acute angle range with respect to the wearing part.

The second antenna may be disposed adjacent to an edge of the circuit board.

A magnetic body of the second antenna may be parallel with a longitudinal direction of the wearing part.

A magnetic body of the second antenna may be formed of ferrite.

An angle in the acute angle range may be 0 degrees to 30 degrees.

An angle in the acute angle range, as viewed from the front surface of the housing, may be 0 degrees to 30 degrees when measured to a left of the wearing part on the center of the housing.

The front surface of the housing may be implemented to include an analog watch, and the second antenna may be at an 11 o'clock position to a 12 o'clock position of the analog watch as viewed from the front surface of the housing.

As is apparent from the foregoing description, according to an embodiment of the present disclosure, the first antenna in the electronic device is provided between the display and the battery, and the conducting wire-wound magnetic body is disposed parallel with a surface of the display. Thus, a radio signal emitted from the first antenna may travel around the display and the battery to the outside of the electronic device. For example, the radio signal emitted from the first antenna does not receive interference by the display, thereby enhancing emission capability.

According to an embodiment of the present disclosure, the first conducting wire in the electronic device is spaced apart from the second conducting wire while forming the space, leading to an enhanced emission capability for the electronic device.

While the present disclosure has been shown and described with reference to embodiments thereof, it will be apparent to those of ordinary skill in the art that various changes in form and detail may be made thereto without departing from the spirit and scope of the present disclosure as defined by the appended claims.

What is claimed is:

1. An electronic device, comprising:
 a battery;
 a display;
 at least one first antenna provided at a front of the battery;
 a display circuit board disposed between the battery and the at least one first antenna;
 a circuit board disposed opposite the at least one first antenna with respect to the battery;
 a wireless charging antenna disposed below the circuit board; and
 at least one second antenna provided at a rear of the battery, wherein the at least one first antenna and the at least one second antenna include a magnetic body and a conducting wire that is wound around the magnetic body multiple times in a first direction with respect to a first axis that is substantially parallel with a surface of the display,
 wherein the at least one first antenna is disposed between the display and the display circuit board.

2. The electronic device of claim 1, wherein the at least one first antenna includes a magnetic secure transmission antenna, and the at least one second antenna includes a near-field communication antenna.

3. The electronic device of claim 1, wherein the at least one first antenna and the at least one second antenna each are shaped as a solenoid that is formed as the conducting wire is wound around the magnetic body.

4. The electronic device of claim 1, wherein the at least one second antenna is provided on the circuit board that is provided at a rear of the battery.

5. The electronic device of claim 4, wherein the at least one second antenna is provided between the battery and the circuit board.

6. The electronic device of claim 1, wherein the battery blocks a magnetic force between the at least one first antenna and the wireless charging antenna.

7. The electronic device of claim 1, further comprising a connector connecting the at least one first antenna with the circuit board, wherein the at least one first antenna receives an electrical signal through the connector.

8. An electronic device, comprising:
 a battery;
 a display;
 at least one antenna provided at a front of the battery and including a first conducting wire that is wound multiple times in a first axial direction that is substantially parallel with a surface of the display and a second conducting wire that is spaced apart from the first conducting wire, forms a space, and is wound multiple times in the first axial direction;
 a display circuit board disposed between the battery and the at least one antenna;
 a circuit board disposed opposite the at least one antenna with respect to the battery; and
 a wireless charging antenna disposed below the circuit board,
 wherein the at least one antenna is disposed between the display and the display circuit board.

9. The electronic device of claim 8, further comprising at least one other antenna provided at a rear of the battery, wherein the at least one antenna includes a magnetic secure transmission antenna, and the at least one other antenna includes a near field communication antenna.

10. The electronic device of claim 8, wherein the first conducting wire is electrically connected with the second conducting wire.

11. The electronic device of claim 8, wherein the at least one antenna generates a radio signal that passes through the display via the space between the first conducting wire and the second conducting wire.

12. The electronic device of claim 8, wherein an electronic part is disposed in the space and includes an illumination sensor or a camera.

13. The electronic device of claim 1, further comprising:
 a housing; and
 a wearing part coupled to the housing and having a longitudinal direction, the wearing part configured to be wrapped around a user's wrist,
 wherein the circuit board is disposed inside the housing and having the at least one second antenna mounted thereon, and
 wherein the at least one second antenna, as viewed from a front surface of the housing, is positioned away from a center of the housing within an acute angle range with respect to the wearing part.

14. The electronic device of claim 13, wherein the at least one second antenna is disposed adjacent to an edge of the circuit board.

15. The electronic device of claim 13, wherein a magnetic body of the at least one second antenna is parallel to the longitudinal direction of the wearing part.

16. The electronic device of claim 13, wherein a magnetic body of the at least one second antenna is formed of ferrite.

17. The electronic device of claim 13, wherein an angle in the acute angle range is 0 degrees to 30 degrees.

18. The electronic device of claim 13, wherein an angle in the acute angle range, as viewed from the front surface of the housing, is 0 degrees to 30 degrees when measured to a left side of the wearing part from the center of the housing.

19. The electronic device of claim 13, wherein the front surface of the housing is implemented to include an analog watch, and
 wherein the at least one second antenna is at an 11 o'clock position to a 12 o'clock position of the analog watch as viewed from the front surface of the housing.

* * * * *